(12) United States Patent
Tang et al.

(10) Patent No.: US 11,953,448 B2
(45) Date of Patent: Apr. 9, 2024

(54) METHOD FOR DEFECT INSPECTION

(71) Applicant: TAIWAN SEMICONDUCTOR MANUFACTURING COMPANY LTD., Hsinchu (TW)

(72) Inventors: Tsun-Cheng Tang, Tainan (TW); Hao-Ming Chang, Pingtung (TW); Sheng-Chang Hsu, New Taipei (TW); Cheng-Ming Lin, Yunlin County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 754 days.

(21) Appl. No.: 16/842,678

(22) Filed: Apr. 7, 2020

(65) Prior Publication Data

US 2021/0096086 A1   Apr. 1, 2021

Related U.S. Application Data

(60) Provisional application No. 62/907,459, filed on Sep. 27, 2019.

(51) Int. Cl.
*G01N 21/88* (2006.01)
*G01N 21/95* (2006.01)

(52) U.S. Cl.
CPC ..... *G01N 21/8851* (2013.01); *G01N 21/9501* (2013.01); *G01N 2021/8887* (2013.01)

(58) Field of Classification Search
CPC .......... G06T 2207/30148; G06T 7/001; G01N 21/956; G01N 2021/95676;

(Continued)

(56) References Cited

U.S. PATENT DOCUMENTS 6,218,704 B1 * 4/2001 Brown ................ H01L 27/0288
257/E29.063
6,272,236 B1 8/2001 Pierrat et al.
(Continued)

FOREIGN PATENT DOCUMENTS

DE  102019209394 A1  12/2020
JP  2015141130 A  8/2015
(Continued)

OTHER PUBLICATIONS

U.S. Pat. No. 9,747,520 is the English counterpart to TWI 6684368.
(Continued)

*Primary Examiner* — Mohamed Charioui
*Assistant Examiner* — Lynda Dinh
(74) *Attorney, Agent, or Firm* — WPAT LAW; Anthony King

(57) ABSTRACT

A method for defect inspection includes receiving a substrate having a plurality of patterns; obtaining a gray scale image of the substrate, wherein the gray scale image includes a plurality of regions, and each of the regions has a gray scale value; comparing the gray scale value of each region to a gray scale references to define a first group, a second group and an $N^{th}$ group, wherein each of the first group, the second group and the $N^{th}$ group has at least a region; performing a calculation to obtain a score; and when the score is greater than a value, the substrate is determined to have an ESD defect, and when the score is less than the value, the substrate is determined to be free of the ESD defect.

20 Claims, 25 Drawing Sheets

(58) Field of Classification Search
CPC ....... G01N 2021/1765; G01N 21/8851; G01N 21/9501; G01N 2021/8887; H01L 22/12; G01R 29/08; G02F 2203/30
See application file for complete search history.

(56) References Cited

U.S. PATENT DOCUMENTS

| | | | |
|---|---|---|---|
| 6,504,948 B1* | 1/2003 | Schemmel | G06T 7/001 382/149 |
| 6,603,873 B1 | 8/2003 | Gordon et al. | |
| 6,660,540 B2* | 12/2003 | Englisch | H01L 22/34 257/48 |
| 6,829,381 B2 | 12/2004 | Levin et al. | |
| 7,379,175 B1 | 5/2008 | Stokowski et al. | |
| 7,630,535 B2* | 12/2009 | Isomura | G06T 7/001 382/145 |
| 8,188,545 B2* | 5/2012 | Saiki | G09G 3/3688 257/361 |
| 9,747,520 B2 | 8/2017 | Li et al. | |
| 2002/0076840 A1 | 6/2002 | Englisch | |
| 2006/0067571 A1* | 3/2006 | Onishi | G06T 7/001 382/149 |
| 2010/0226562 A1* | 9/2010 | Wu | G03F 7/7065 382/149 |
| 2013/0271595 A1* | 10/2013 | Hiroi | G06T 7/0004 348/80 |
| 2015/0379707 A1* | 12/2015 | Tsuchiya | G06T 7/001 348/126 |
| 2020/0409255 A1 | 12/2020 | Tabbone et al. | |

FOREIGN PATENT DOCUMENTS

| | | |
|---|---|---|
| KR | 20040062654 A | 7/2004 |
| TW | I 6684368 | 8/2019 |

OTHER PUBLICATIONS

U.S. Pat. No. 6829381B2 Corresponds to KR20040062654A.
English Abstract of JP2015141130A.
US20200409255A1 Corresponds to DE102019209394A1.

* cited by examiner

METHOD FOR DEFECT INSPECTION

PRIORITY DATA

This patent claims the benefit of U.S. Provisional Patent Application Ser. No. 62/907,459 filed Sep. 27, 2019, the entire disclosure of which is hereby incorporated by references.

BACKGROUND

The semiconductor integrated circuit industry has experienced rapid growth in the past several decades. Technological advances in semiconductor materials and design have produced continuously smaller and more complex circuits. These material and design advances have been made possible as the technologies related to processing and manufacturing have also undergone technical advances. In the course of semiconductor evolution, the number of interconnected devices per unit of area has increased as the size of the smallest component that can be reliably created has decreased.

Semiconductor fabrication relies heavily on the process of photolithography, in which light of a given frequency is used to transfer a desired pattern onto a wafer undergoing semiconductor processing. To transfer the pattern onto the wafer, a photomask (also referred to as a mask or reticle) is often used. The photomask permits light in a desired pattern onto a layer on the wafer, such as a photoresist (PR) layer, which chemically reacts to the light exposure, removing some portions of the PR and leaving other portions. The remaining PR is then used to pattern an underlying layer. As feature sizes have decreased, the wavelength of light used in photolithography to pattern layers has decreased as well, creating additional difficulties and necessitating technological advances, such as the use of extreme ultraviolet (EUV) as a light source, and phase-shifting masks. Improving photomasks is important to facilitating continuing advances in the industry, in particular because imperfections in the patterned layer can be compounded during subsequent processing steps in the manufacture of semiconductor devices and integrated circuits. Photomask improvements, including improvements to defects inspection, are therefore required.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 7 to 14A are schematic views illustrating a photomask at various fabrication stages according to aspects of the present disclosure in one or more embodiments.

DETAILED DESCRIPTION

Figure 1:
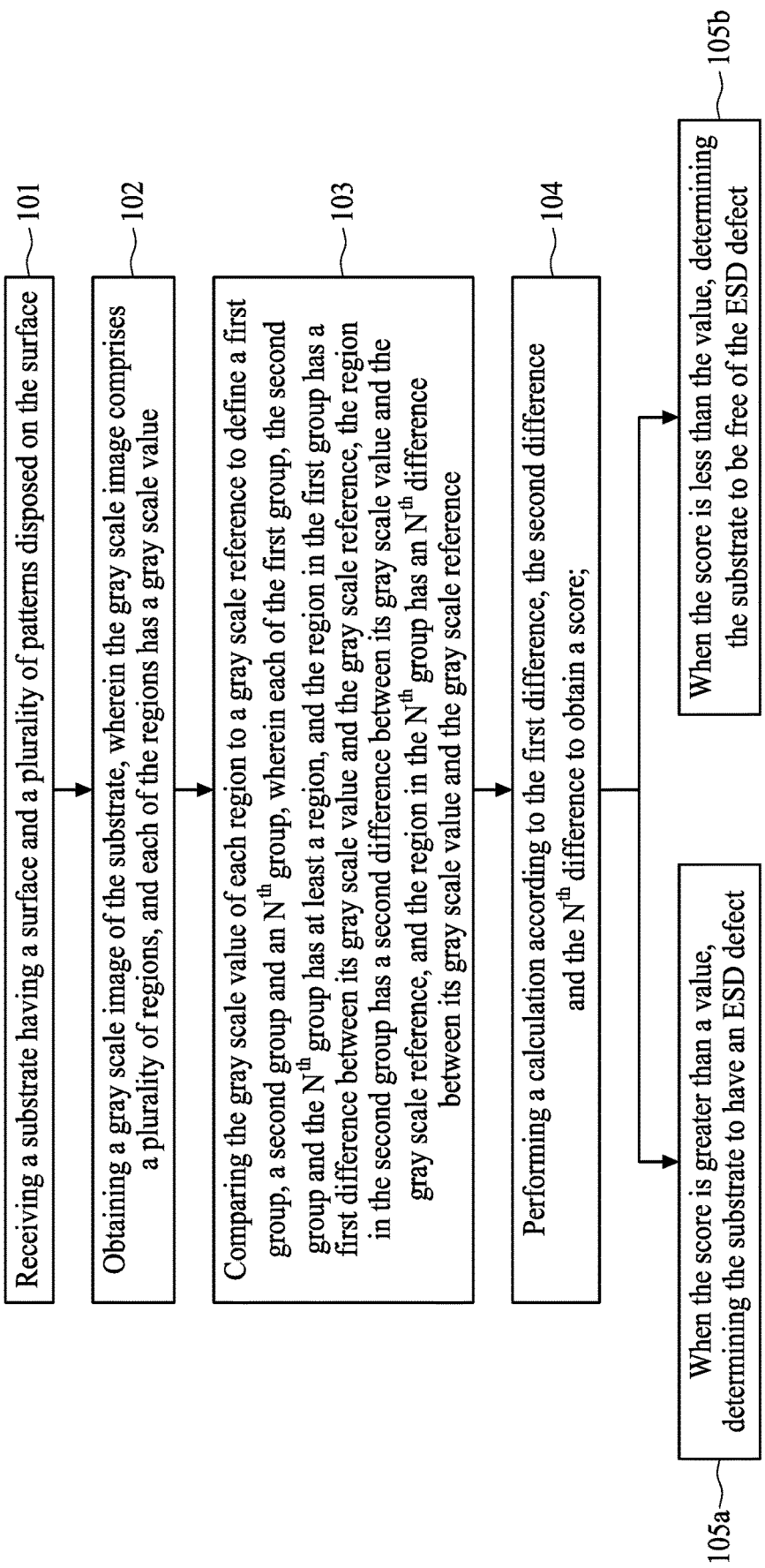
FIG. 1 is a flowchart representing a method for defect inspection according to aspects of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat references numerals and/or letters in the various examples. This repetition is for the purpose of simplicity and clarity and does not in itself dictate a relationship between the various embodiments and/or configurations discussed.

This description of illustrative embodiments is intended to be read in connection with the accompanying drawings, which are to be considered part of the entire written description. In the description of embodiments disclosed herein, any references to direction or orientation is merely intended for convenience of description and is not intended in any way to limit the scope of the present disclosure. Relative terms such as "lower," "upper," "horizontal," "vertical," "above," "below," "up," "down." "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected" and "interconnected" refer to a relationship wherein structures are secured or attached to one another either directly or indirectly through intervening structures, as well as both movable or rigid attachments or relationships, unless expressly described otherwise. Moreover, the features and benefits of the disclosure are illustrated by references to the embodiments. Accordingly, the disclosure expressly should not be limited to such embodiments illustrating some possible non-limiting combination of features that may exist alone or in other combinations of features, the scope of the disclosure being defined by the claims appended hereto.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" or "about" generally mean within a value or range that can be contemplated by people having ordinary skill in the art. Alternatively, the terms "substantially," "approximately" or "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

Inspection is an important operation and is utilized to detect photomask defects after photomask fabrication is completed or after exposure operation. Photomask defects can be divided into two categories, hard defects and soft defects. Defects that cannot be removed by cleaning operations are referred to as hard defects, and defects that can be removed by the cleaning operations are referred to as soft defects. The hard defects include, for example, global uniformity changes, miss-sizing, or misplacement. When the hard defects are found and identified, the photomask may be repaired or reworked using proper operations. In some comparative embodiments, post-plasma treatment can be executed if residue defects, such as Cr residue defects, are detected. In some comparative embodiments, ion or electron beam can be used if localized hard defects are found. In some comparative embodiments, chemical solutions can be used if global miss-sizing defects are found. The repaired or reworked photomask is then inspected again to ensure mask quality. However, in some comparative embodiments, defect types such as electrostatic discharge (ESD) defect and complicated defect may not be found when using the current inspection model.

The ESD defect can appear after the exposure operation. During the exposure operation, or during transferring or storing of the photomask, static electricity may be generated, and tends to form an electric field on the photomask. As the electric field attracts electrically-charged particles to the photomask, a neutralizing discharge reaction is triggered on the surface of the photomask, burning or melting the mask pattern. The ESD defects are not easily detected by current inspection methods because the ESD defect forms as an imperceptible thin layer on a surface. As a result, the photomask having the ESD defects undetected by the inspection tool may be used in the subsequent photolithography operation. In some comparative embodiments, the pattern on the defective photomask cannot be accurately and precisely transferred.

In addition to the ESD defects, there is a complicated defect. The complicated defect occurs when a shielding layer or a hard mask layer that is supposed to be removed remains on the photomask. The complicated defect includes two types. In one type, when the shielding layer appears at a location from which it should be removed, a shielding layer extension defect is said to occur. In another type of defect, when the hard mask layer, which is supposed to be entirely removed from the photomask, appears, a hard mask/shielding layer extension defect is said to occur. The two types of defects are referred to as complicated defects because both the shielding layer extension defect and the hard mask/shielding layer extension defect show similar results when using the current inspection tool, and it is difficult for the inspection tool to determine which type of layer remains on the photomask. It should be noted that the shielding layer and the hard mask layer are removed by different removal operations. If an unsuitable removal operation is used, the layer slated for removal will not be removed, or other layers may be mistakenly removed. Because the inspection tool cannot determine which layer remains on the photomask, further inspection operation is required to avoid the unsuitable removal operation. Thus, the existing method suffers from cycle time waste.

The present disclosure therefore provides a method for defect inspection. In some embodiments, the method for defect inspection is performed to detect the ESD defects. In some embodiments, the method for defect inspection provides a first calculation. The first calculation is used to amplify the ESD defect and thus the presence of the ESD defect can be determined. In some embodiments, the method for defect inspection is performed to detect the complicated defects. In some embodiments, the method for defect inspection provides a second calculation. The second calculation helps to distinguish between the shielding layer extension defect and the hard mask/shielding layer extension defect. Thus, the suitable removal operation can be performed. The provided method for defect inspection is able to precisely detect and identify the defects using the current inspection tool. Accordingly, inspection reliability can be improved, and inspection cycle time can be reduced. Further, extra cost for tool modification can be avoided.

FIG. 1 is a flowchart representing a method for defect inspection 100 according to aspects of the present disclosure. The method 100 includes a number of operations (101, 102, 103, 104, 105a and 105b). The method for defect inspection 100 will be further described according to one or more embodiments. It should be noted that the operations of the method for defect inspection 100 may be rearranged or otherwise modified within the scope of the various aspects. It should further be noted that additional processes may be provided before, during, and after the method 100, and that some other processes may only be briefly described herein. Thus other implementations are possible within the scope of the various aspects described herein.

In some embodiments, the method for defect inspection can be used in a lithography system. In some embodiments, the lithography system can be referred to as a scanner that is operable to perform a lithography exposing operation with respective radiation source and exposure mode. In some embodiments, the lithography system may include an optical exposing tool, such as I-line (365 nm), deep ultraviolet (DUV, with wavelength less than about 250, but more typically, from about 193 nm to about 230 nm is used), extreme ultraviolet (EUV), or X-ray exposing tool, or a charged particle tool such as an electron beam writer. In various embodiments, the method can be performed by using combinations of dedicated, fixed-function computing elements and programmable computing elements executing software instructions. Accordingly, the lithography system can include a computing system. It is understood that the operations in the method 100 may be implemented by the computing system using corresponding instructions stored on or in a non-transitory machine-readable medium accessible by the processing system.

Figure 2:
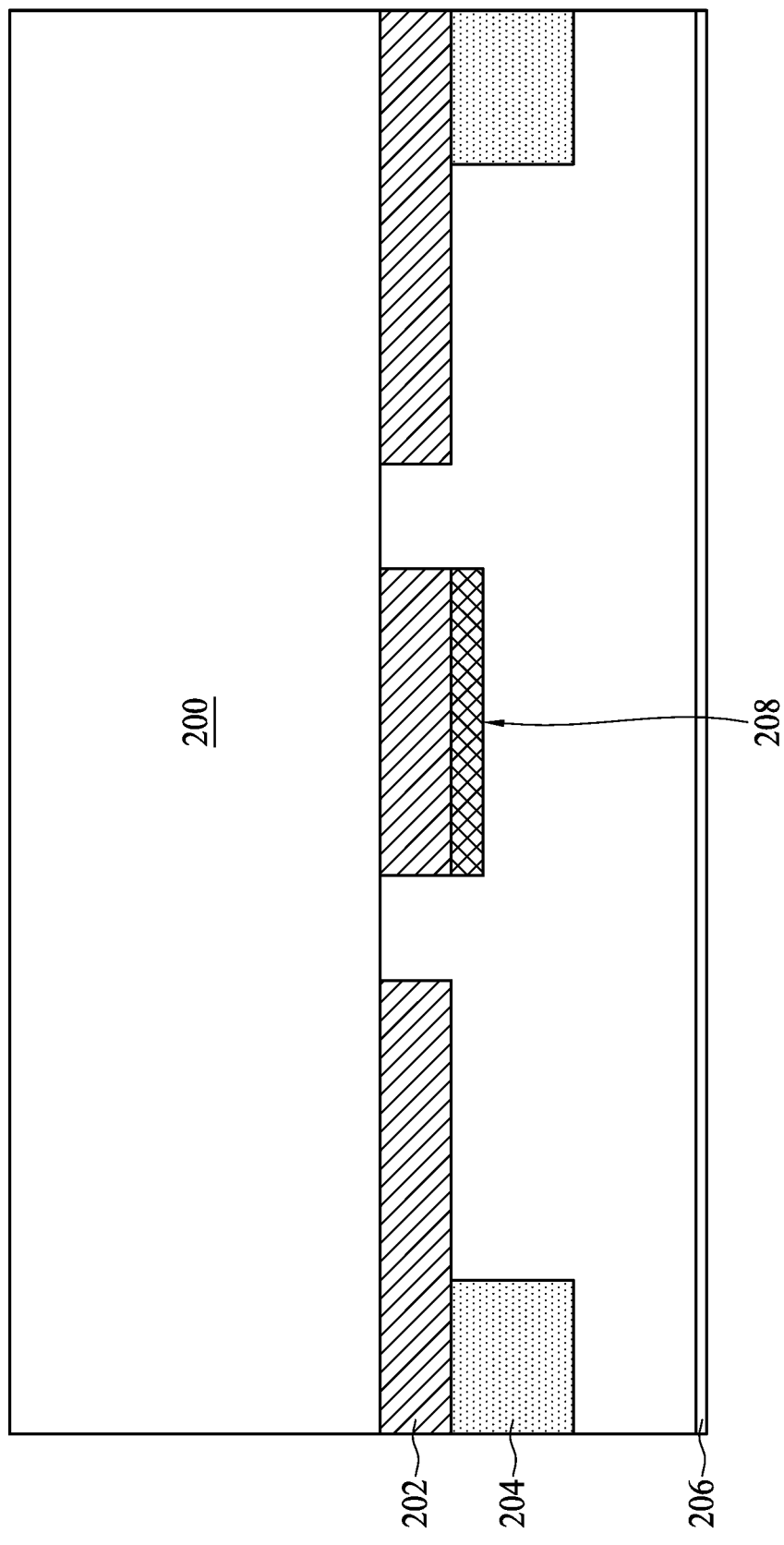
FIG. 2 is a cross-sectional view of a photomask according to aspects of the present disclosure.

Referring to FIG. 2, which is a cross-sectional view of a photomask PM1 according to aspects of the present disclosure, the photomask PM1 includes a light-transmitting substrate 200 with a suitable material, such as a low thermal expansion material (LTEM) or fused quartz. In various examples, the LTEM includes $TiO_2$-doped $SiO_2$, or other suitable materials with low thermal expansion. The photomask PM1 includes a phase-shifting layer (PSL) 202 formed over the substrate 200. The phase-shifting layer 202 is formed to transmit less than about 20% of incident light and produce a phase shift of about 180 degrees with respect to transmitted light (i.e., light transmitted through the light-transparent substrate). In some embodiments, the phase-shifting layer 202 includes molybdenum silicide (MoSi), molybdenum-silicide-nitride (MoSiN), molybdenum silicide oxynitride (MoSiON), titanium nitride, titanium silicon nitride or silicon nitride, but the disclosure is not limited to this. In some embodiments, the photomask PM1 may include a shielding layer 204 over the phase shifting layer 202. The shielding layer 204 may include chromium (Cr), and may include other layers such as chromium oxide, chromium nitride and chromium oxynitride. Although some examples are provided of materials that may be used for each of the substrate 200, the phase-shifting layer 202 and the shielding layer 204, it will be understood that other suitable materials as known in the art may be equally used without departing from the scope of the present disclosure. Additionally, the photomask PM1 may include other layers such as a backside coating layer and/or an anti-reflective coating (ARC), though not shown. Further, other photomask configurations may also be provided as the photomask PM1.

Still referring to FIG. 2, the photomask PM1 may include a pellicle 206, which is used to serve as a protective cover. The pellicle 206 can protect the patterns over the substrate 200 from damage and/or contaminant particles. The pellicle 206 can be a thin film on a frame which covers a patterned surface of the photomask PM1.

Referring to FIG. 2, in an exposure operation, light is directed to the photomask PM1 and reflected by the photomask PM1, and light reflected by the photomask PM1 is then directed to a wafer. During the exposure operation, the pellicle 206 may absorb the light. In some comparative embodiments, heat effects and static electricity may be generated. Consequently, an unwanted thin film 208 may be formed over the patterns formed by the phase-shifting layer 202, as shown in FIG. 2. The thin film 208, as mentioned above, is referred to as an ESD defect. In some embodiments, the method of defect inspection 100 can be performed after the exposure operations.

Referring to FIG. 2, at operation 101, a substrate having a surface and a plurality of patterns disposed on the surface is received.

In some embodiments, the substrate can be the photomask PM1 as mentioned above. In some embodiments, the substrate can be the substrate 200 of the photomask PM1. and the patterns can be formed by the phase-shifting layer 202, but the disclosure is not limited to this.

At operation 102, a gray scale image of the substrate is obtained, wherein the gray scale image includes a plurality of regions, and each of the regions has a gray scale value.

Figure 3:
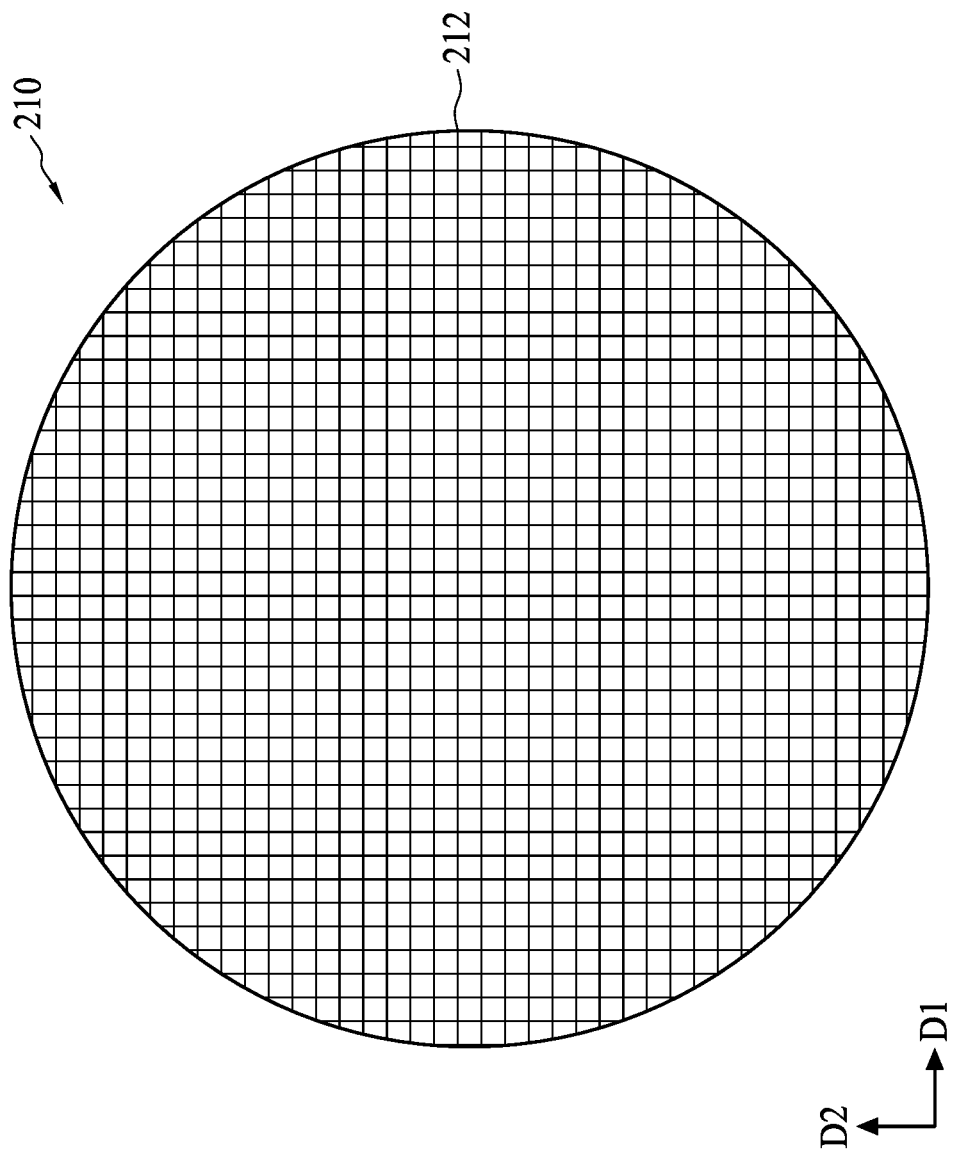
FIGS. 3 to 5 are schematic drawings of the photomask at various stages according to aspects of the present disclosure in one or more embodiments.

Referring to FIG. 3, in some embodiments, a surface of the substrate 200 of the photomask PM1 is scanned by an optical inspection tool to produce an image 210 of the pattern. In some embodiments, the photomask PM1 can be scanned after removing the pellicle 206. In some embodiments, the photomask PM1 can be scanned by a reflective optical inspection tool and thus reflected light is generated from the surface of the substrate 200. The image, in the illustrated embodiment, is produced by the optical inspection tool and depicts the pattern elements in the pattern of the photomask PM1 as a lighter gray on a darker gray background. That is, different portions of the obtained image 210 have different gray scale intensities, and thus the obtained image 210 is referred to as a gray scale image. In some embodiments, the image 210 can be divided into or defined into as a plurality of regions 212. In some embodiments, each of the regions 212 substantially corresponds to a pixel of the reflective optical inspection tool. In some embodiments, an area of each region 212 can be between approximately 55 $nm^2$ and approximately 500 $nm^2$, but the disclosure is not limited thereto. Further, the image 210 can be converted into a gray level image by light leveling to scale the gray level of the image region by region. Consequently, each of the regions 212 obtains a gray scale value.

At operation 103, the gray scale value of each region 212 is compared to a gray scale reference to define a first group G1, a second group G2 and an $N^{th}$ group Gn, wherein each of the first group G1, the second group G2 and the $N^{th}$ group Gn has at least a region 212, and the region 212 in the first group G1 has a first difference between its gray scale value and the gray scale reference, the region 212 in the second group G2 has a second difference between its gray scale value and the gray scale reference, and the region 212 in the $N^{th}$ group Gn has an $N^{th}$ difference between its gray scale value and the gray scale reference.

In some embodiments, a standard or golden image can be provided. The standard or golden image may include a target pattern, to which the pattern of the photomask PM1 is supposed to be identical. The standard or golden image can be defined into or divided into as a plurality of regions. Subsequently, the golden image can be converted using light leveling to scale the standard or golden image to obtain the gray scale reference region by region. As mentioned above, in some embodiments, each region of the golden image substantially corresponds to a pixel of the reflective optical inspection tool. In some embodiments, the gray scale reference can be obtained from a database of the defect inspection tool. Consequently, the gray scale reference also includes a plurality of gray scale values.

Figure 4:
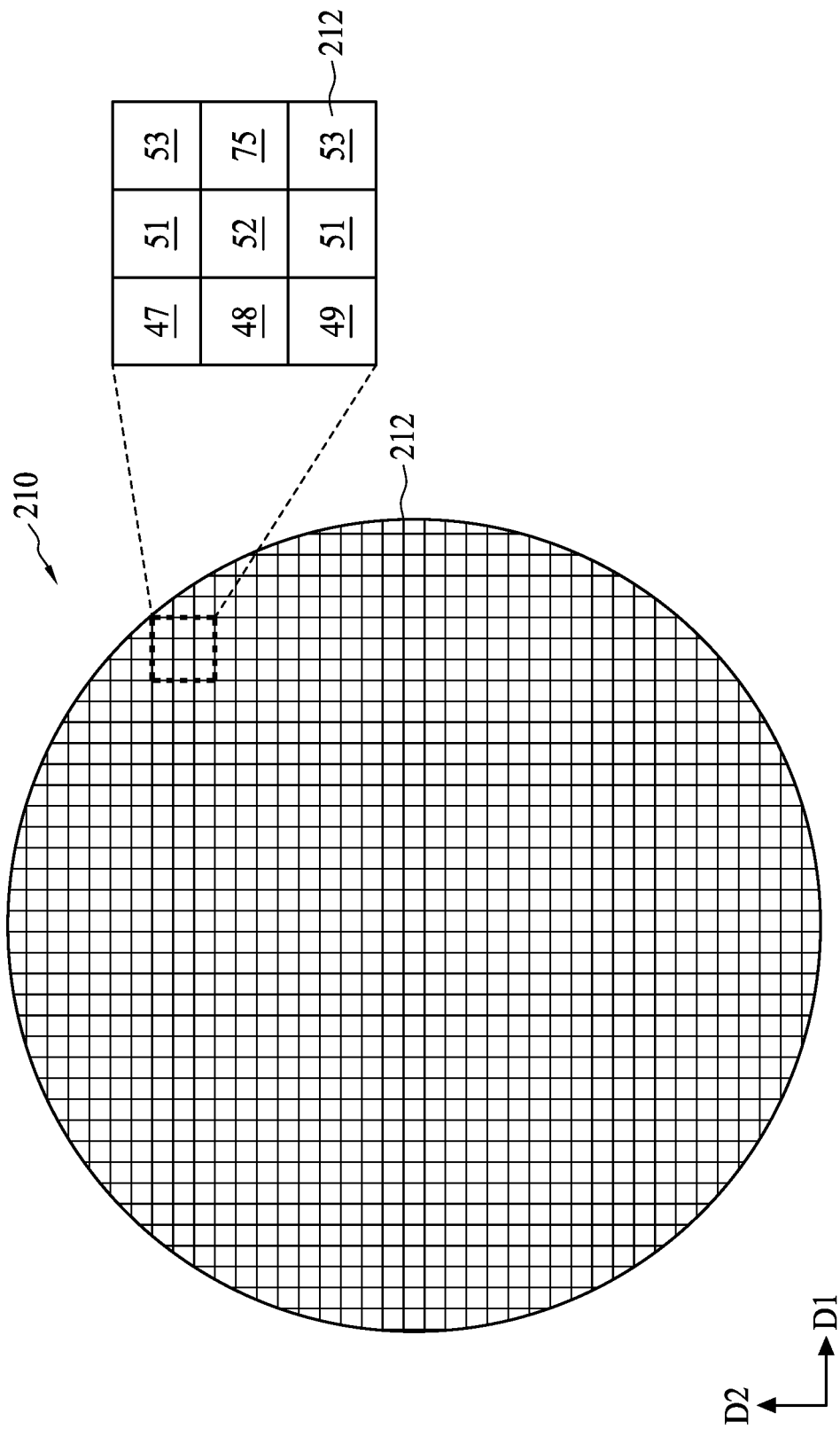

In some embodiments, the gray scale value of each of the regions 212 in the image 210 of the photomask PM1 is compared to one of the gray scale values of the gray scale reference. In some embodiments, the gray scale value of the region 212 of the photomask is compared to that of the corresponding region of the gray scale reference. Accordingly, a difference between the gray scale value of each of the regions 212 of the photomask PM1 and the gray scale value of the corresponding region of the gray scale reference is obtained. Referring to FIG. 4, each of the regions 212 has a difference.

Figure 5:
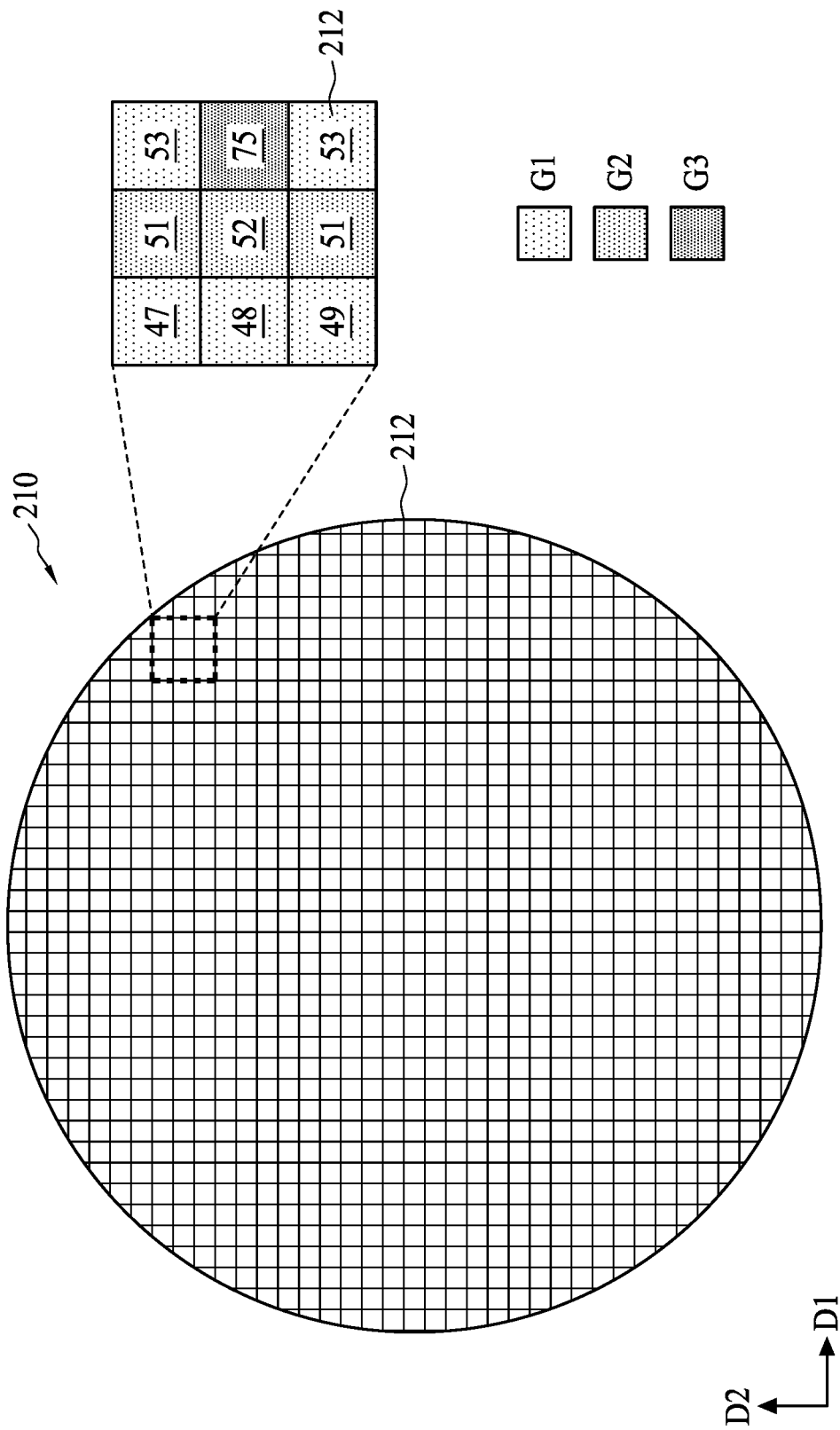

Referring to FIG. 5, the regions 212 are grouped into the first group G1, the second group G2 and the $N^{th}$ group according to its difference, respectively. In some embodiments, the grouping of the regions 212 can be performed according to Table 1:

|  | Gray scale difference | Weighting factor |
|---|---|---|
| First group (G1) | −50-0 & 0-50 | 0.9 |
| Second group (G2) | −69--50 & 50-69 | 0.925 |
| Third group (G3) | −89--70 & 70-89 | 0.95 |
| Fourth group (G4) | −99--90 & 90-99 | 0.975 |
| Fifth group (G5) | <−100 & >100 | 1 |

As shown in Table 1, ranges are provided, and regions 212 having differences in the same range are grouped into a same group. In some embodiments, each of the first group G1, the second group G2 and the $N^{th}$ group Gn has at least a region 212. The region 212 in the first group G1 has a first difference between its gray scale value and the gray scale reference, the region 212 in the second group G2 has a second difference between its gray scale value and the gray scale reference, and the region 212 in the $N^{th}$ group Gn has an $N^{th}$ difference between its gray scale value and the gray scale reference. In some embodiments, the first difference is less than the second difference, and the $(N-1)^{th}$ difference is less than the $N^{th}$ difference, as shown in Table 1.

At operation 104, a calculation is performed according to the first difference, the second difference and the $N^{th}$ difference to obtain a score. In some embodiments, the calculation is performed according to an equation (1):

$$W_S = \frac{\Sigma e_1(G)_{G1} + \Sigma e_2(G)_{G2} + \Sigma e_3(G)_{G3} + \cdots \Sigma e_n(G)_{Gn}}{\Sigma(G)_{G1,G2,G3,\ldots Gn}} \quad (1)$$

Wherein Ws is the score, G is the individual difference of the region in the first region G1, the second region G2, the third region G3 and the $N^{th}$ region $G_N$, $e_1$ is a first weighting factor, $e_2$ is a second weighting factor, and $e_n$ is an $N^{th}$ weighting factor.

In some embodiments the first weight factor $e_1$, the second weighting factor $e_2$ and the $N^{th}$ weighting factor $e_n$ can be the weighting factors provided by Table 1, but the disclosure is not limited to this. In such embodiments, the first weighting factor $e_1$ is less than the second weighting factor $e_2$, and the $(N-1)^{th}$ weighting factor $e_{(n-1)}$ is less than the $N^{th}$ weighting factor $e_n$.

For example, in some embodiments, the differences as shown in FIG. 5 can be used in the calculation.

$$W_S = \frac{(47+48+49) \times 0.9 + (51+51+52+53+53) \times 0.925 + 75*0.95}{47+48+49+51+51+52+53+53+75} = 0.921$$

According to the equation (1), the score Ws is obtained as shown above.

At operation 105a, when the score Ws is greater than a value, the substrate is determined to have an ESD defect. At operation 105b, when the score is less than the value, the substrate is determined to be free of the ESD defect.

In some embodiments, the value can be 0.92. In such embodiments, the score Ws, which is 0.921 as mentioned above, is greater than the value, and thus the photomask PM1 is determined to have an ESD defect.

It should be noted that the difference between the gray scale values of the regions 212 of the image 210 and the gray scale values of the gray scale reference may show a variation between a surface condition of the patterns on the photomask PM1 after the exposure operation and an original surface condition of the photomask PM1 or a standard surface condition of the photomask PM1. A greater difference may indicate that the surface condition of the photomask PM1 being inspected is more different from the original surface condition than that found in a similar comparison showing a less difference. Further, the greater difference may be amplified by multiplying the gray scale value by the weighting factor. Consequently, the ESD defect can be easily detected.

In some embodiments, an aerial image measurement system (AIMS) is used when the substrate is determined to have the ESD defect. The AIMS is a measurement methodology which can provide a capability to simulate the exposure result on a substrate, i.e., a photomask substrate, by, including but not limited to, optical proximity correction (OPC), mask error enhancement factor (MEEF), and mask 3D effects information. In some embodiments, the AIMS can be used to double check the ESD defect.

In some embodiments, determination of the photomask PM1 as being free of the ESD defect should indicate that a thin film has not formed over the pattern (i.e., the phase shifting-layer 202); however, such thin film may have formed over the pattern but is not thick enough to alter the reflection and therefore may not be detected. Consequently, the photomask PM1 might be used in a subsequent exposure operation. In some embodiments, determination of the photomask PM1 as having the ESD defect indicates that a thin film may have formed over the pattern (i.e., the phase-shifting layer 202), and the thin film is thick enough to alter the reflection, and thus the exposure result may be negatively affected. Consequently, the photomask PM1 determined to have the ESD defect is removed from the subsequent exposure operation, and a proper operation can be performed to remove the thin film.

As mentioned above, the ESD defect occurs when a thin film is formed over the pattern surface of the photomask PM1. The ESD defect may not be distinguishable but may still cause serious problem in the exposure operation. By grouping the regions 212 into the first group G1, the second group G2 and the $N^{th}$ group Gn, and by providing different weight factors for different groups, the groups having the ESD defect can be amplified and therefore more easily identified. Further, by providing the calculation with the equation (1), the score Ws, which may represent the condition of the entire surface, can be easily obtained. In addition, the ESD defect can be detected when the score Ws is greater than the value. In some embodiments, the value is adjustable. In short, the method for defect inspection 100 can be performed to detect the ESD defect using the current inspection tool. Because the method for defect inspection 100 provides a weighting model (as shown in the equation (1)), the ESD defects can be amplified and easily detected.

Figure 6:
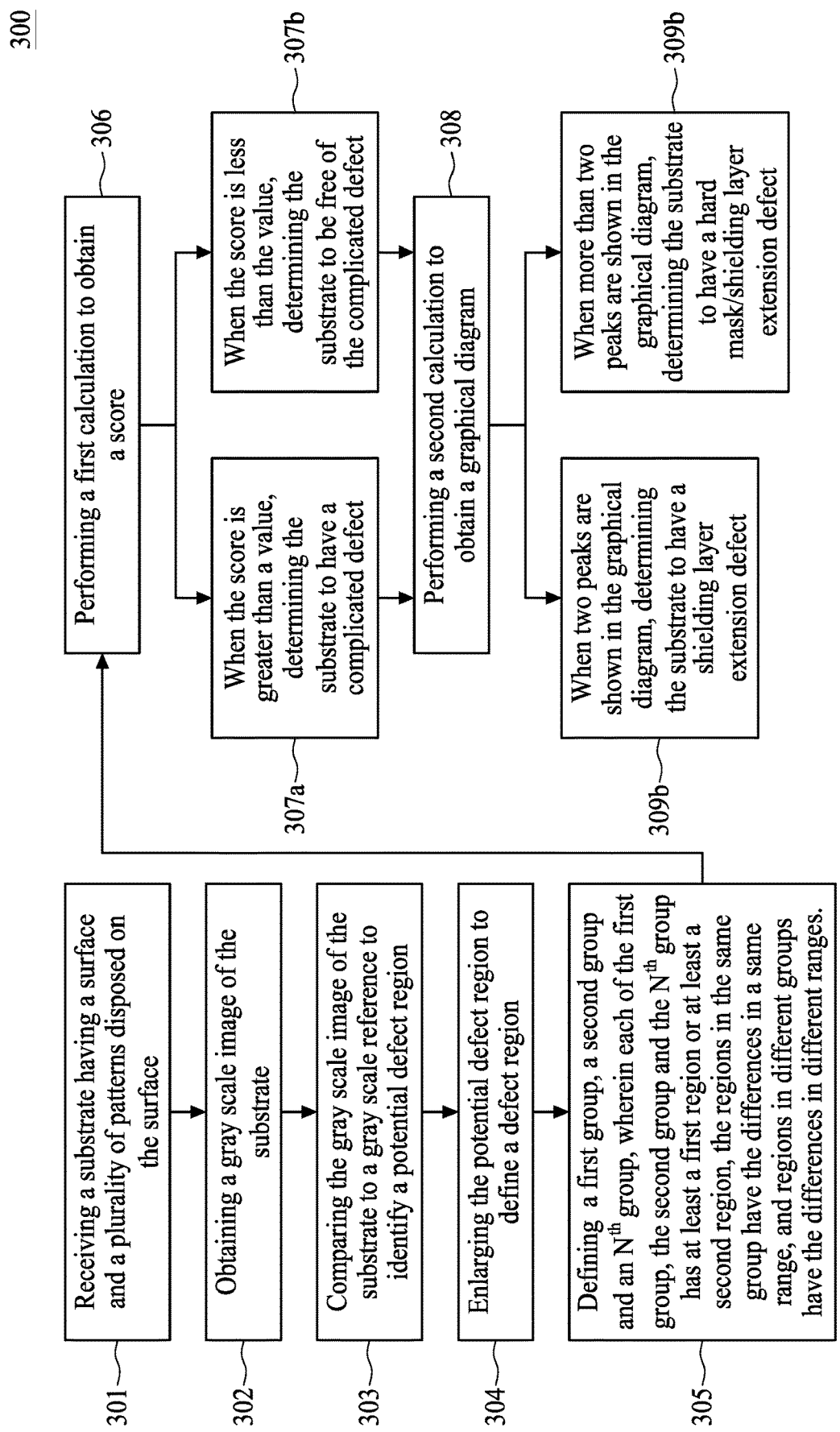
FIG. 6 is a flowchart representing a method for defect inspection according to aspects of the present disclosure.
Figure 12:
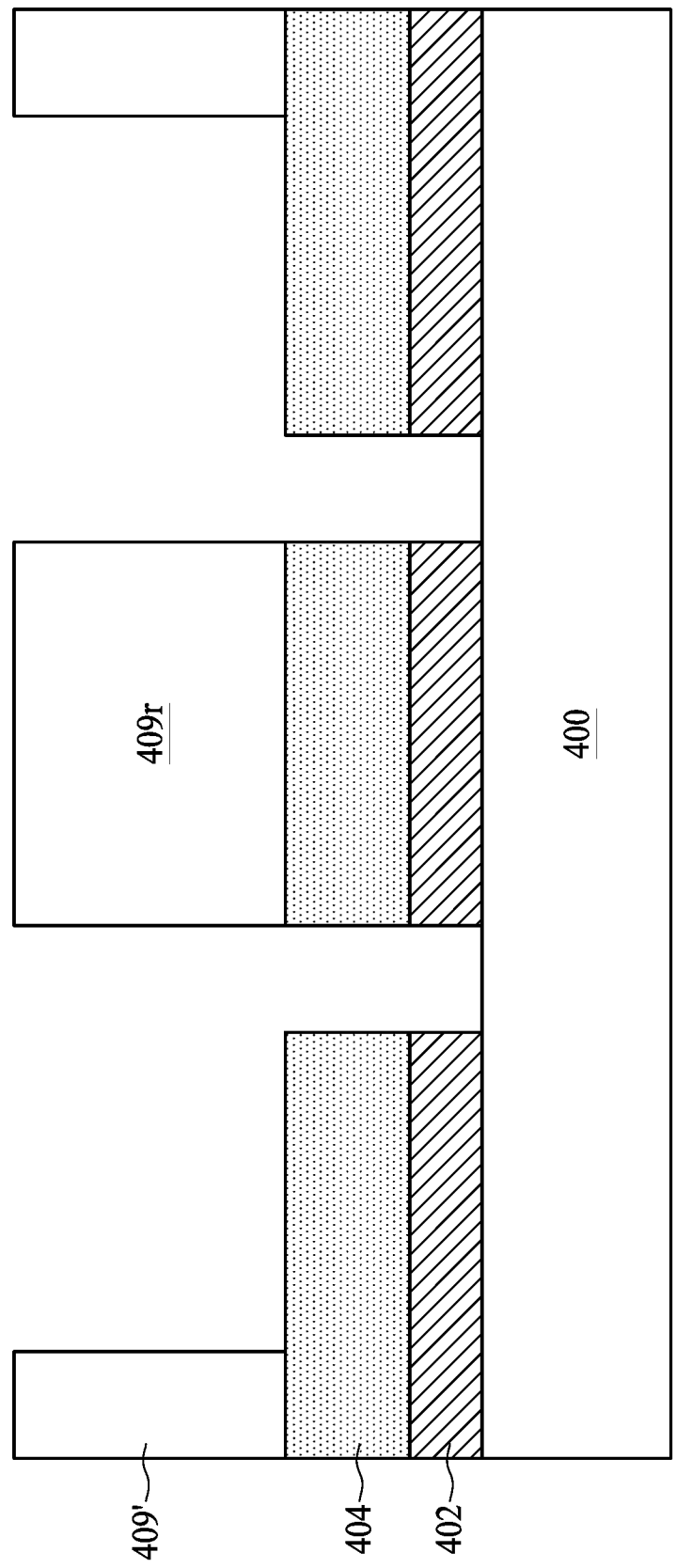
Figure 13:
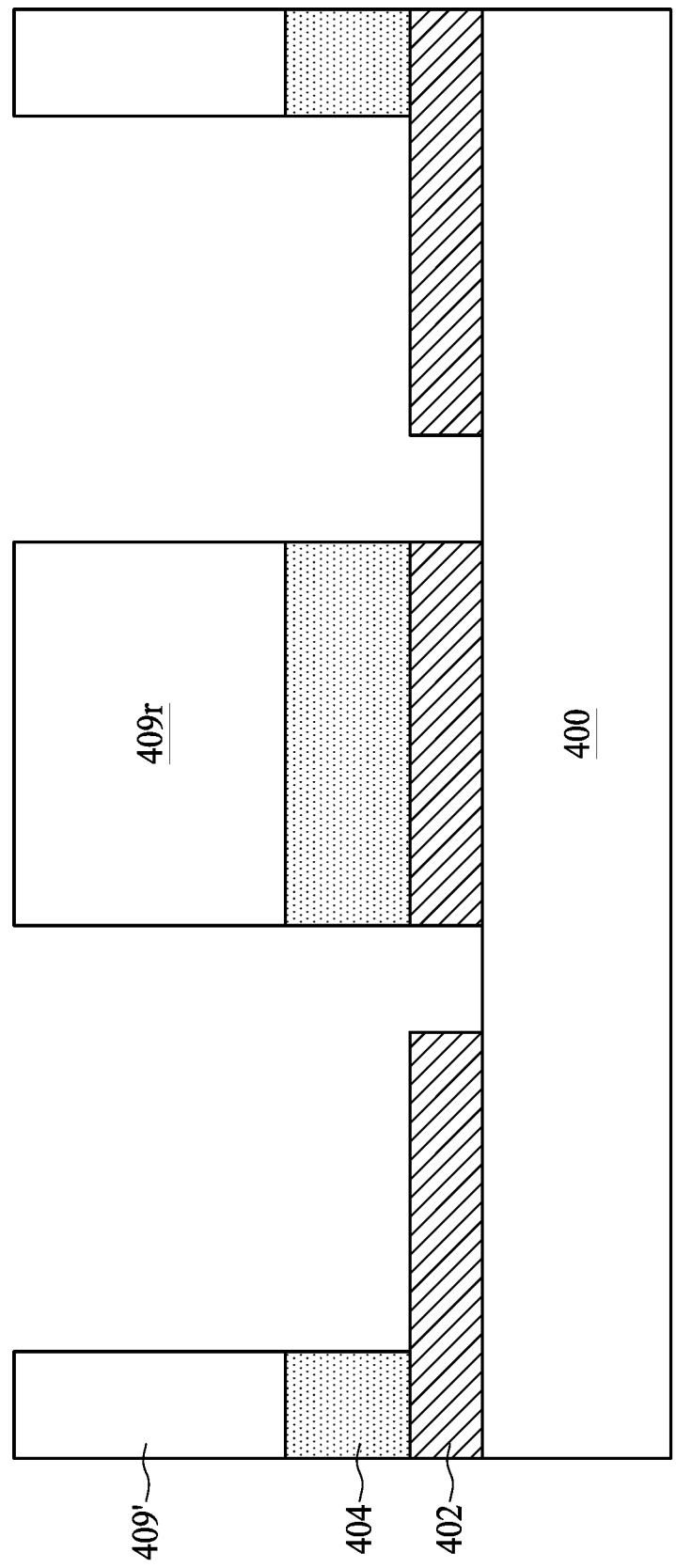
Figure 14B:
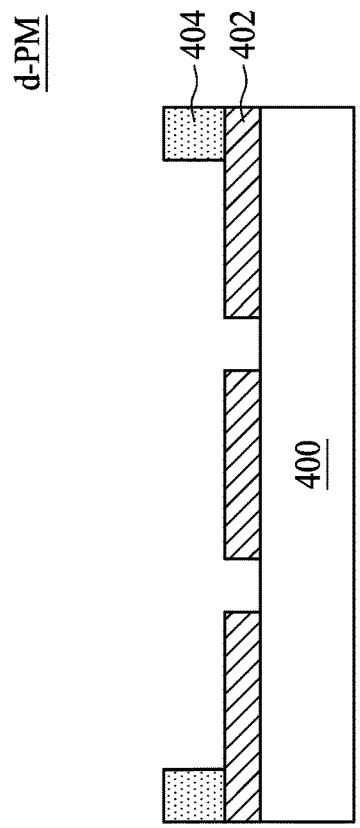
FIG. 14B is a schematic view illustrating a desired photomask.
Figure 14A:
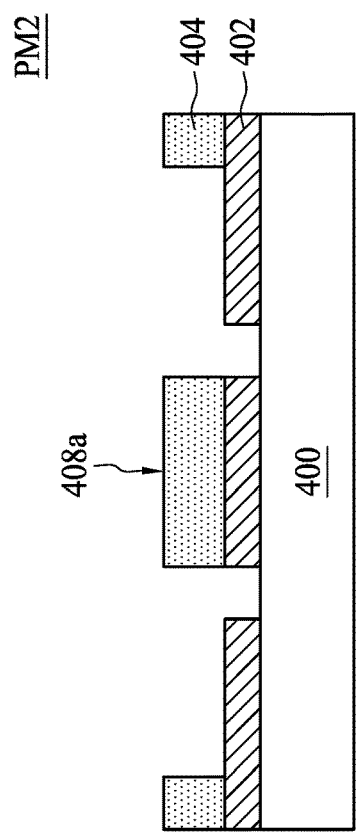
Figure 15:
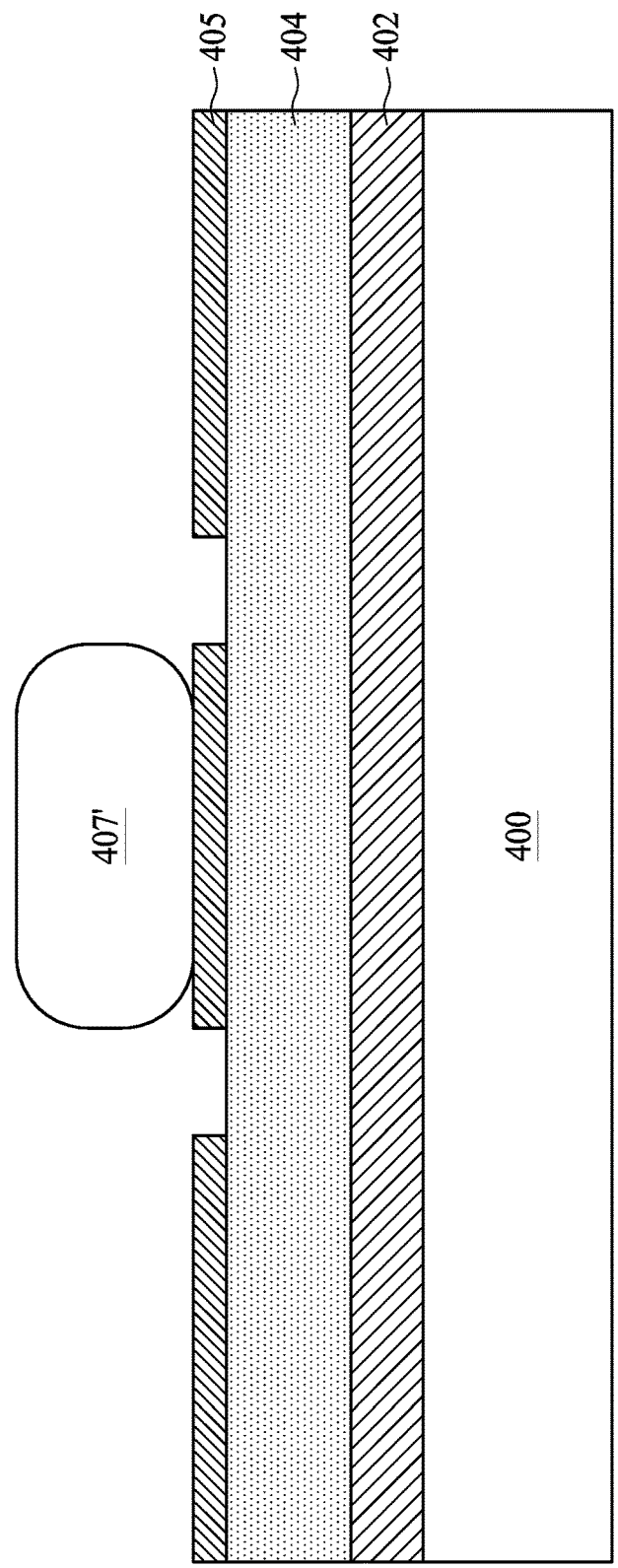
FIGS. 15 and 16A are schematic views illustrating a photomask at various fabrication stags according to aspects of the present disclosure in one or more embodiments.
Figure 16A:
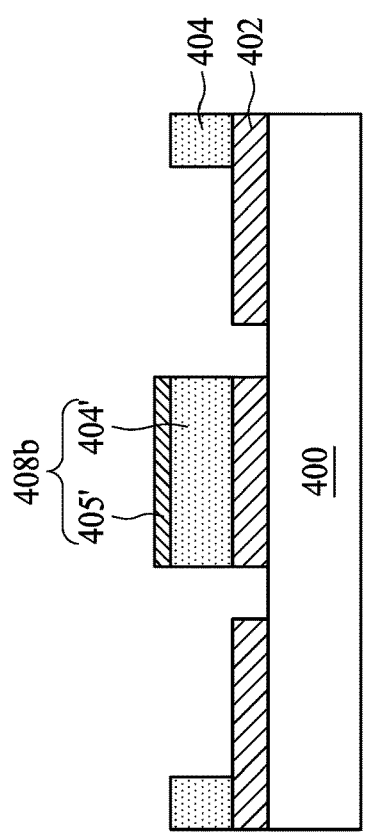
Figure 16B:
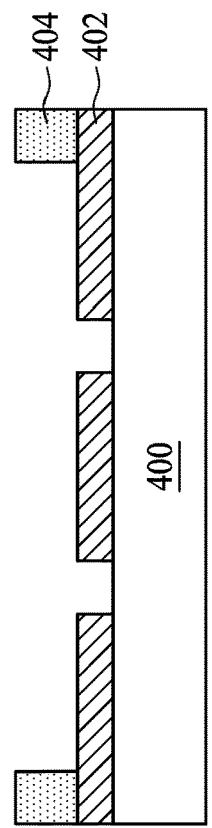
FIG. 16B is a schematic view illustrating a desired photomask.

FIG. 6 is a flowchart representing a method for defect inspection 300 according to aspects of the present disclosure, FIGS. 7 to 14A are schematic drawings illustrating a photomask at various stages according to aspects of the present disclosure in one or more embodiments, FIG. 14B is a schematic drawing illustrating a desired photomask, FIGS. 15 and 16A are schematic drawings illustrating a photomask at various stages according to aspects of the present disclosure in one or more embodiments, and FIG. 16B is a schematic drawing illustrating a desired photomask. The method 300 includes a number of operations (301, 302, 303, 304, 305, 306, 307a and 307b). The method for defect inspection 300 will be further described according to one or more embodiments. It should be noted that the operations of the method for defect inspection 300 may be rearranged or otherwise modified within the scope of the various aspects. It should further be noted that additional processes may be provided before, during, and after the method 300, and that some other processes may be only briefly described herein. Thus other implementations are possible within the scope of the various aspects described herein.

In some embodiments, the method for defect inspection 300 can be performed after photomask manufacturing operations. In some embodiments, the method for defect inspection 300 can be performed after phase-shift photomask manufacturing operations. In some embodiments, the method for defect inspection 300 can be performed after hard mask attenuated phase shift mask (HMAPSM) manufacturing operations.

It should be noted that same elements in method 100 and method 300 can include same materials, and repeated descriptions are therefore omitted in the interest of brevity.

Figure 7:
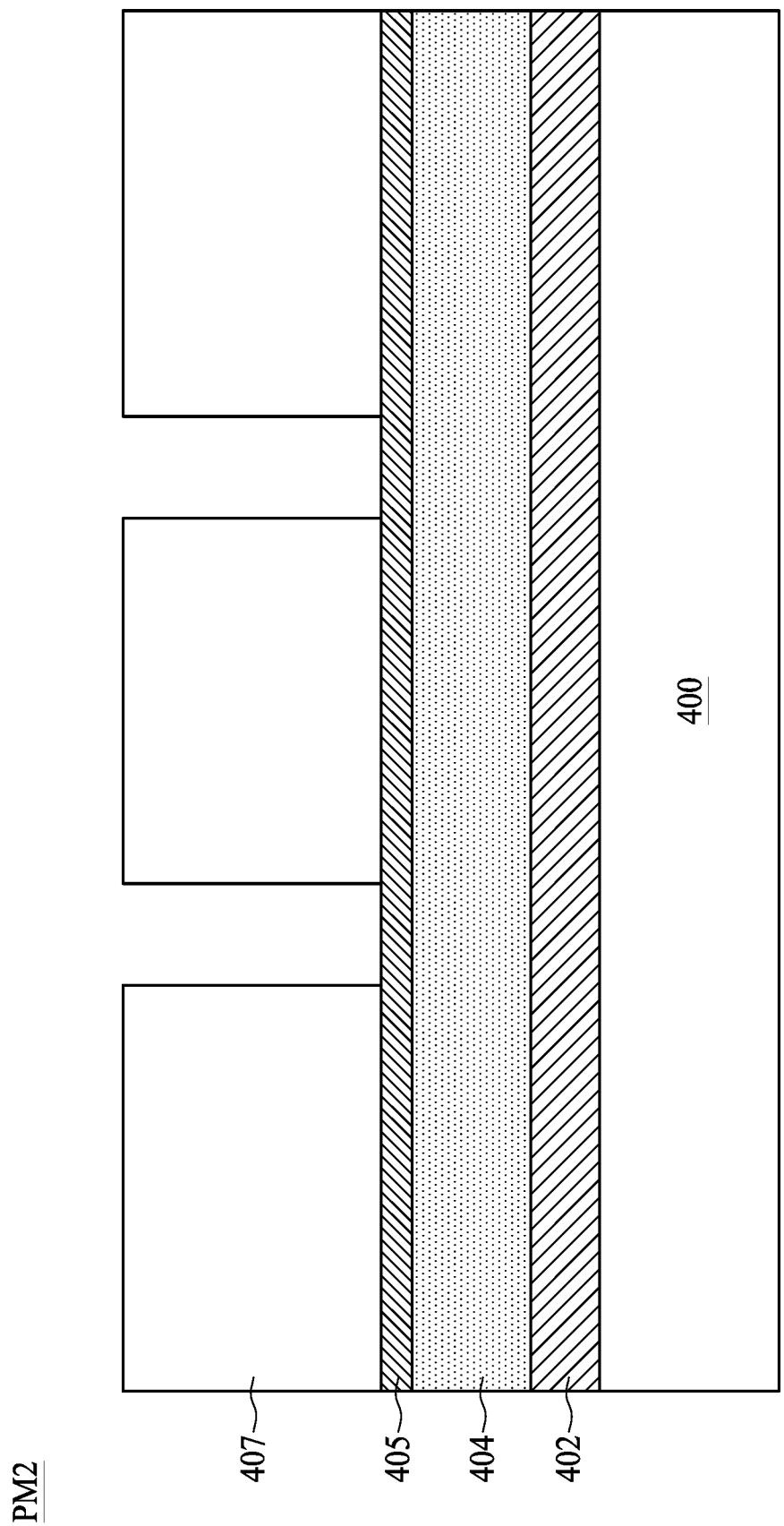

Referring to FIG. 7, in some embodiments, the photomask manufacturing operation may include following operations. A substrate 400 is provided. The substrate 400 can be a light-transmitting substrate. A phase-shifting layer 402 can be formed on the substrate 400. The deposition of the phase-shifting layer 402 can include atomic layer deposition (ALD), chemical vapor deposition (CVD), physical vapor deposition (PVD), pulsed laser deposition (PLD), sputtering, spin-on deposition (SOD), the like, or a combination thereof. In some embodiments, based on a wavelength of a light source, a thickness of the phase-shifting layer 402 is between approximately 40 nm and approximately 100 nm. In some embodiments, a greater or lesser thickness increases a deviation from a phase shift by π, reducing a pattern resolution. However, one of ordinary skill in the art would understand that the thickness of the phase-shifting layer 402 is determined by a transmission rate of the selected material, wavelength of the light source, and a depth of focus (DOF) during the process. For example, where the phase-shifting layer 402 includes molybdenum and silicon oxynitride, the thickness of the phase-shifting layer 402 may be between approximately 60 nm and approximately 70 nm.

Still referring to FIG. 7, a shielding layer 404 is formed on the phase-shifting layer 402. In some embodiments, the shielding layer 404 can include a light-blocking material sufficient in thickness to block greater than about 90%, and more preferably greater than about 99%, of the incident light from passing through. In some embodiments, the shielding layer 404 may include stacked layers, for example a Cr layer, formed over a glue layer (not shown) as is known in the art. The overall thickness of the shielding layer 404 depends on the desired light transmitting characteristic and etching rate in a subsequent etching operation. Typically, the thickness of the shielding layer 404 is in the range of about 500 Angstroms to about 1500 Angstroms, and may be formed by conventional CVD, PECVD, or PVD deposition methods.

A hard mask layer 405 is formed over the shielding layer 404. In some embodiments, the hard mask layer 405 includes silicon nitride, silicon carbide, silicon oxynitride, silicon oxycarbide or another suitable material. The deposition of the hard mask layer 405 includes ALD, CVD. PVD. PLD, sputtering, SOD, the like, or a combination thereof. In some embodiments, in order to help improve the photolithography process, the hard mask layer 405 can have an anti-reflective property. In some embodiments, the hard mask layer 405 includes silicon oxide, silicon nitride, silicon oxynitride, silicon carbide, or other suitable materials. In some embodiments, the hard mask layer 405 includes a single layer. In some embodiments, the hard mask layer 405 includes multiple layers. In some embodiments, a thickness of the hard mask layer 405 is between approximately 5 nm and approximately 25 nm. In some embodiments, a greater thickness increases a manufacturing cost without a significant improvement in functionality. In some embodiments, a lesser thickness increases a risk of over-etching, resulting in damage to the phase shifter. Subsequently, a patterned photoresist 407 is formed by depositing a photosensitive material layer and performing a photolithography process such as e-beam writing, laser writing, ultraviolet (UV), EUV or other suitable process.

Figure 8:
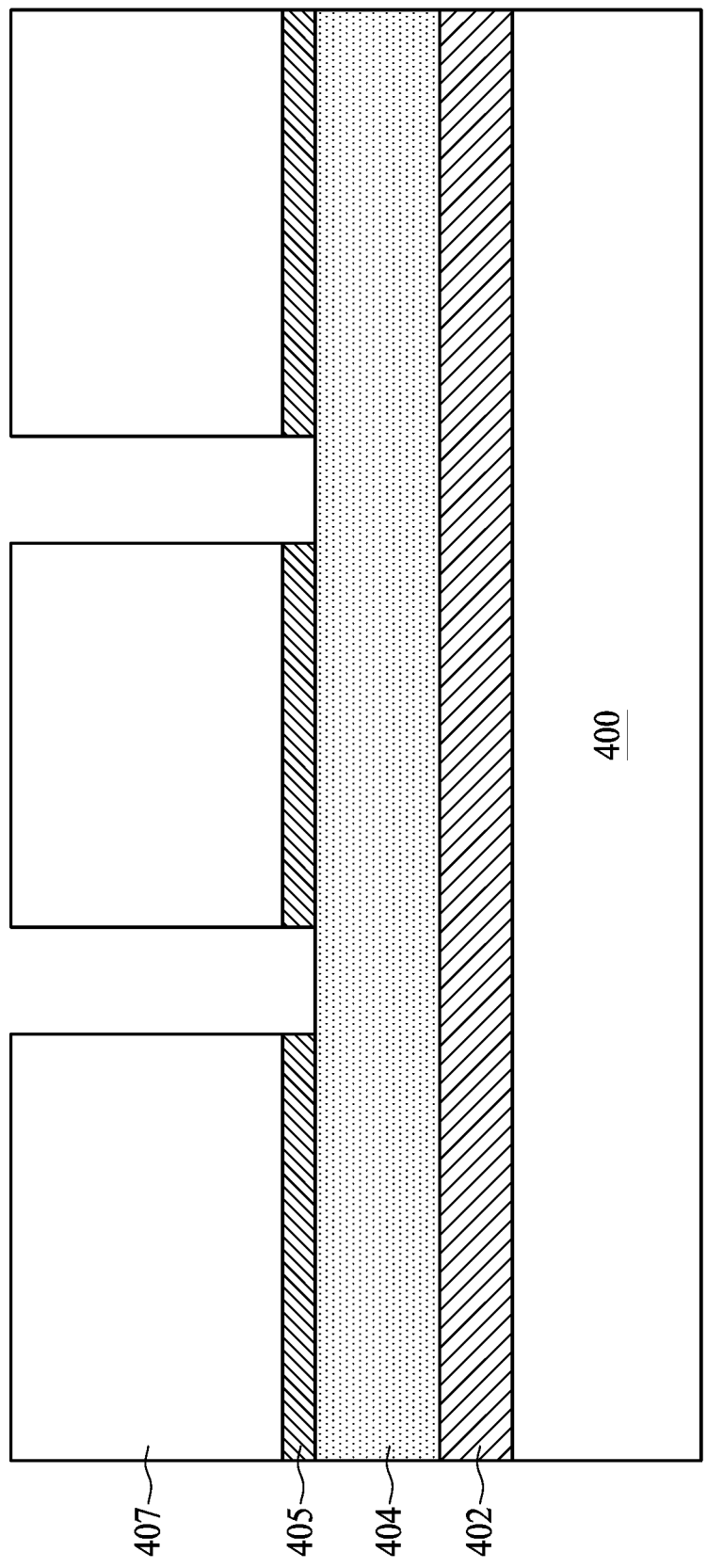
Figure 9:
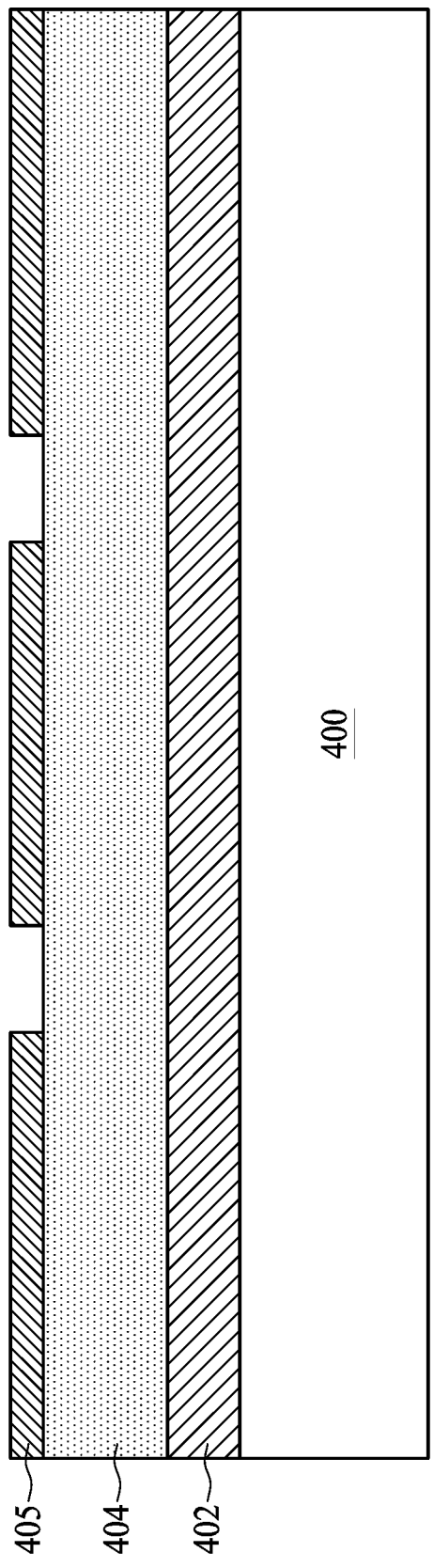
Figure 10:
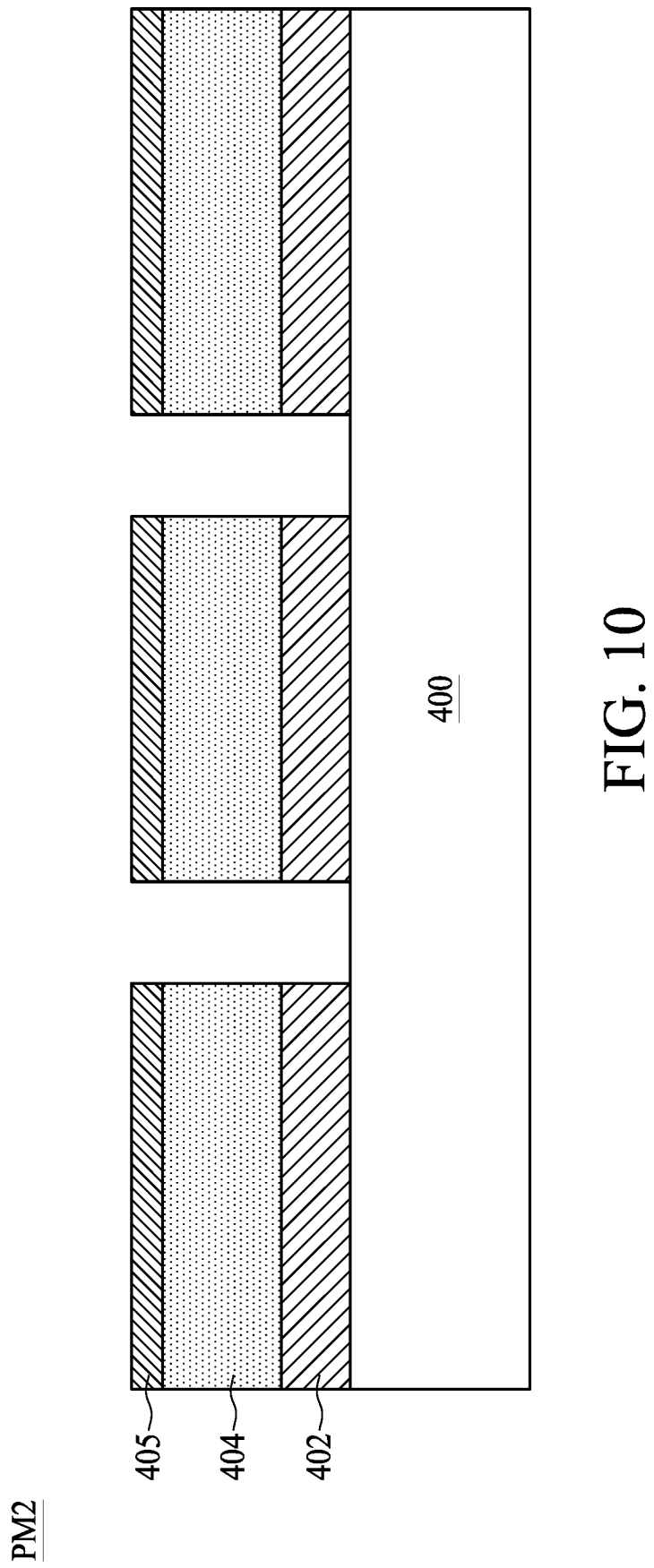
Figure 11:
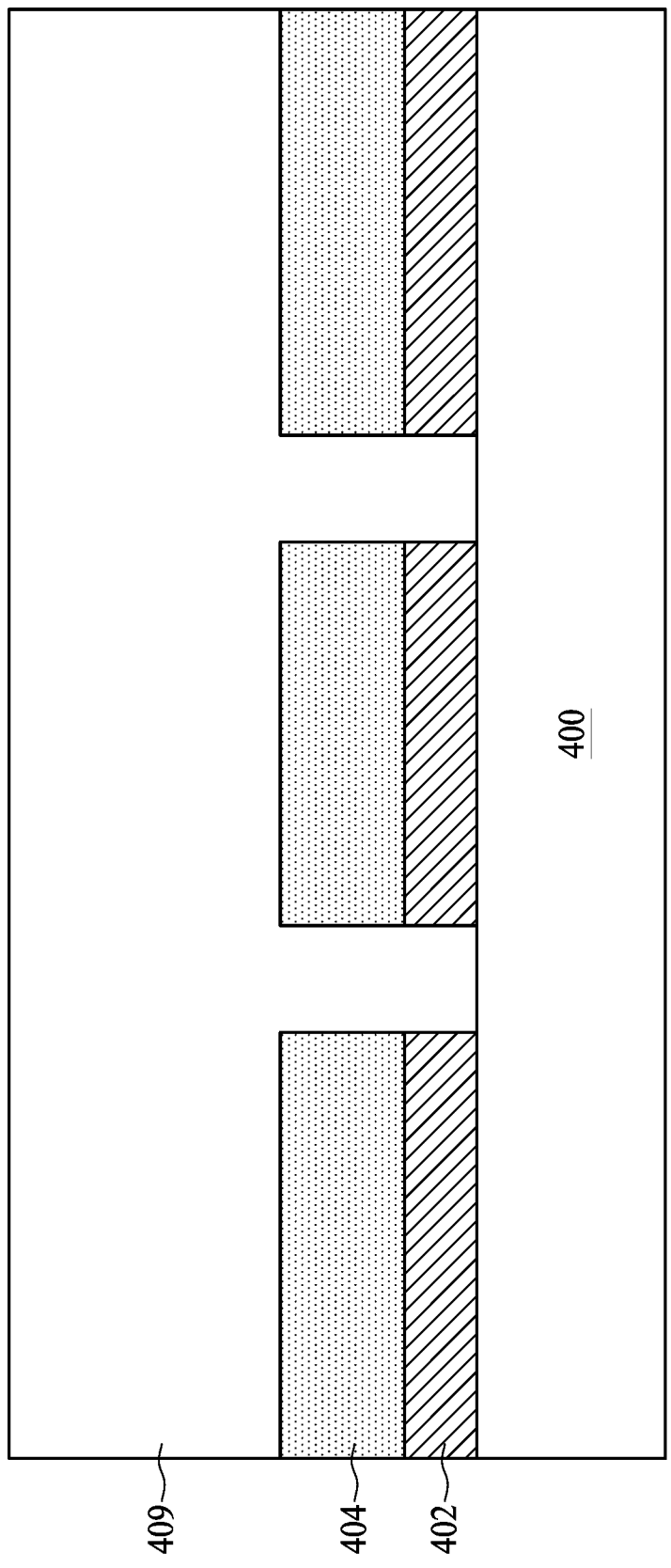

Referring to FIG. 8, the pattern of the patterned photoresist layer 407 is transferred to the hard mask layer 405. After the transferring, the patterned photoresist layer 407 is removed. Referring to FIG. 9, after the removing of the patterned photoresist layer 407, an etching operation is performed to etch the shielding layer 404 and the phase-shifting layer 402 through the patterned hard mask layer 405. Referring to FIGS. 10 and 11, after the etching of the shielding layer 404 and the phase-shifting layer 402, the hard mask layer 405 is removed, and another photoresist layer 409 is formed over the substrate 400. Referring to FIG. 12, a photolithography operation may be performed to form a patterned photoresist layer 409'. In some embodiments, a portion of the patterned photoresist layer 409' that is supposed to be removed by the photolithography operation may be left on the shielding layer 404, and can be referred to as a residue 409r, as shown in FIG. 12. Referring to FIG. 13, in some embodiments, portions of the shielding layer 404 are removed through the patterned photoresist layer 409'.

Referring to FIG. 14A, after the removing of the portions of the phase-shifting layer 402, the patterned photoresist layer 409' is removed. In some comparative embodiments, the residue 409r may be removed during the removing of the patterned photoresist layer 409', and a photomask PM2 is obtained, as shown in FIG. 14A. Because the residue 409r may obstruct the removing of the portion of the shielding layer 404, a portion of the shielding layer that is supposed to be removed may be left on the substrate 400. Referring to FIGS. 14A and 14B, wherein FIG. 14B is a schematic drawing illustrating a desired photomask d-PM, in some comparative embodiments, the leftover portion 408a of the shielding layer may be referred to as a shielding layer extension defect when compared to the desired photomask d-PM. As mentioned above, the shielding layer extension defect 408a is one of the complicated defects.

Other than the shielding layer extension defect, the complicated defects further include a hard mask/shielding layer extension defect. As shown in FIG. 15, in some comparative embodiments, a residue 407' of the patterned photoresist layer 407 may be left on the hard mask layer 405 after the transferring of the pattern of the patterned photoresist layer 407 and the removing of the patterned photoresist layer 407.

The residue 407' may obstruct subsequent etching operations, and thus a portion 405' of the hard mask layer 405 and a portion 404' of the shielding layer 404 that are supposed to be removed are left remaining over the substrate 400. Referring to FIGS. 16A and 16B, wherein FIG. 16B is a schematic drawing illustrating a desired photomask d-PM, in some comparative embodiments, the leftover portions 405' of the hard mask layer 405 and the leftover portion 404' of the shielding layer 404 together may be referred to as a thin film 408b, and such thin film 408b is referred to as a hard mask/shielding layer extension defect when compared to the desired photomask d-PM.

At operation 301, a substrate having a surface and a plurality of patterns disposed on the surface is received.

In some embodiments, the substrate can be the photomask PM2 as mentioned above. In some embodiments, the substrate can be the substrate 400 of the photomask PM2 as shown in FIG. 14A or FIG. 16A, and the patterns can be formed by the phase-shifting layer 402, but the disclosure is not limited to this.

At operation 302, a gray scale image of the substrate is obtained, wherein the gray scale image includes a plurality of regions, and each of the regions has a gray scale value.

Figure 17:
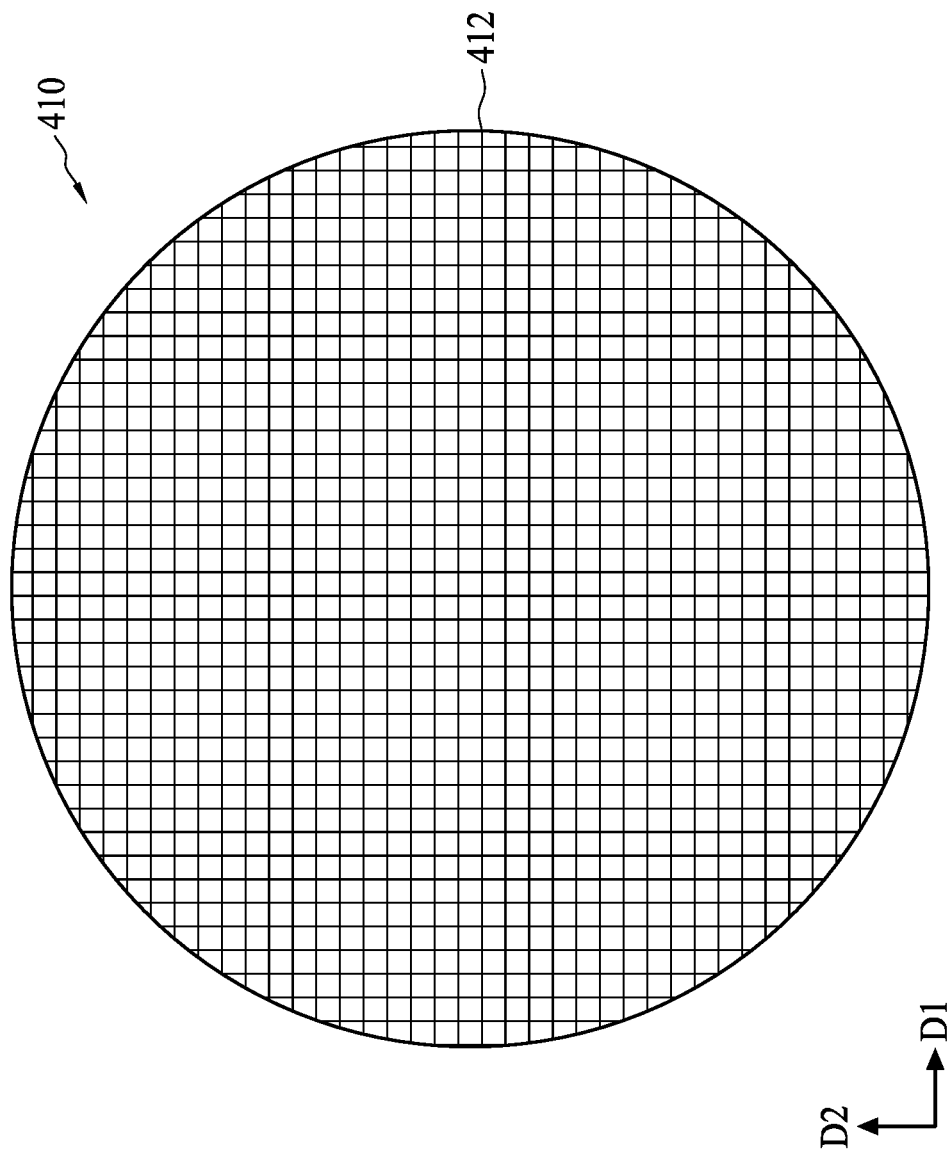
FIGS. 17 to 20 are schematic drawings of the photomask at various stages according to aspects of the present disclosure in one or more embodiments.

Referring to FIG. 17, in some embodiments, a surface of the substrate 400 of the photomask PM2 is scanned by an optical inspection tool to produce an image 410 of the pattern. In some embodiments, the photomask PM2 can be scanned by a reflective optical inspection tool and thus reflected light is generated from the surface of the substrate 400. The image, in the illustrated embodiment, is produced by the optical inspection tool and depicts the pattern elements in the pattern of the photomask PM2 as a lighter gray on a darker gray background. That is, different portions of the obtained image 410 have different gray scale intensities, and thus the obtained image 410 is referred to as a gray scale image. In some embodiments, the image 410 can be divided into or defined into as a plurality of regions 412. In some embodiments, each of the regions 412 substantially corresponds to a pixel of the reflective optical inspection tool. In some embodiments, the regions 412 can be defined along a first direction D1 and a second direction D2 that are perpendicular to each other. In some embodiments, the regions 412 can be defined to form an array having columns and rows, but the disclosure is not limited thereto. Further, the image 410 can be converted into a gray level image by light leveling to scale the gray level of the image region by region. Consequently, each of the regions 412 obtains a gray scale value.

At operation 303, the gray scale image of the substrate is compared to a gray scale reference to identify a potential defect region.

Figure 18:
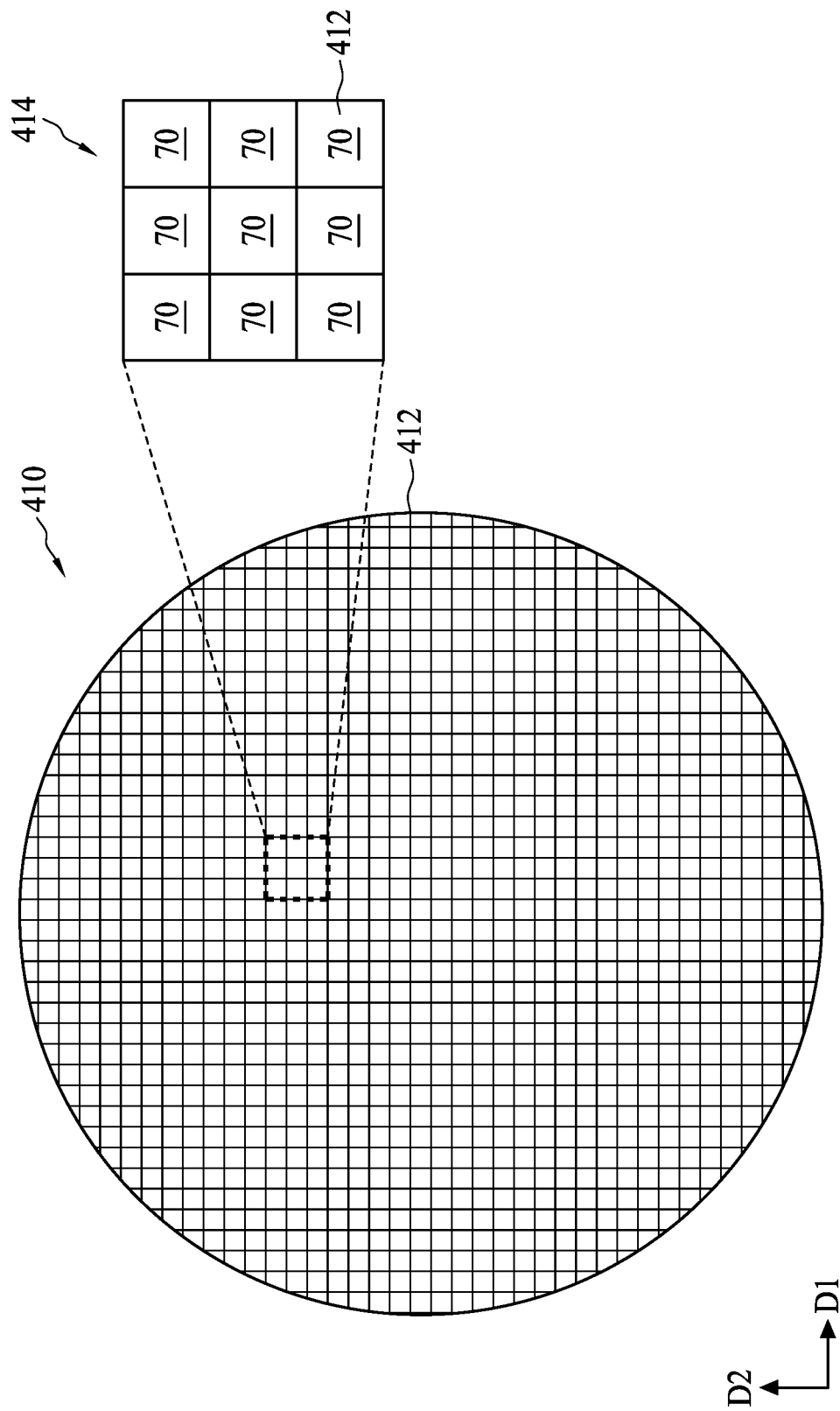

Referring to FIG. 18, the gray scale value of each region 412 is compared to a gray scale reference. In some embodiments, a standard or golden image can be provided. The standard or golden image may be an image of the desired photomask d-PM. The standard or golden image can be defined into or divided into as a plurality of regions. Subsequently, the standard or golden image can be converted by light leveling to scale the standard or golden image to obtain the gray scale references region by region. As mentioned above, in some embodiments, each region of the golden image substantially corresponds to a pixel of the reflective optical inspection tool. In some embodiments, the gray scale reference can be obtained from a database of the defect inspection tool. Consequently, the gray scale reference also includes a plurality of gray scale values.

In some embodiments, the gray scale value of each region 412 in the image 410 of the photomask PM2 is compared to the gray scale value of the gray scale reference. In some embodiments, the gray scale value of each region 412 of the photomask PM2 is compared to the gray scale value of the corresponding region of the gray scale reference. Accordingly, a difference between the gray scale value of each region 412 of the photomask PM2 and the gray scale value of the corresponding region of the gray scale reference is obtained. Referring to FIG. 18, each of the regions 412 has a difference. Further, when the difference is greater than a value, a region having the difference greater than the value can be recognized as a potential defect region 414. In some embodiments, the potential defect region 414 can include one or more regions 412, as shown in FIG. 18.

At operation 304, the potential defect region is enlarged to define a defect region.

Figure 19:
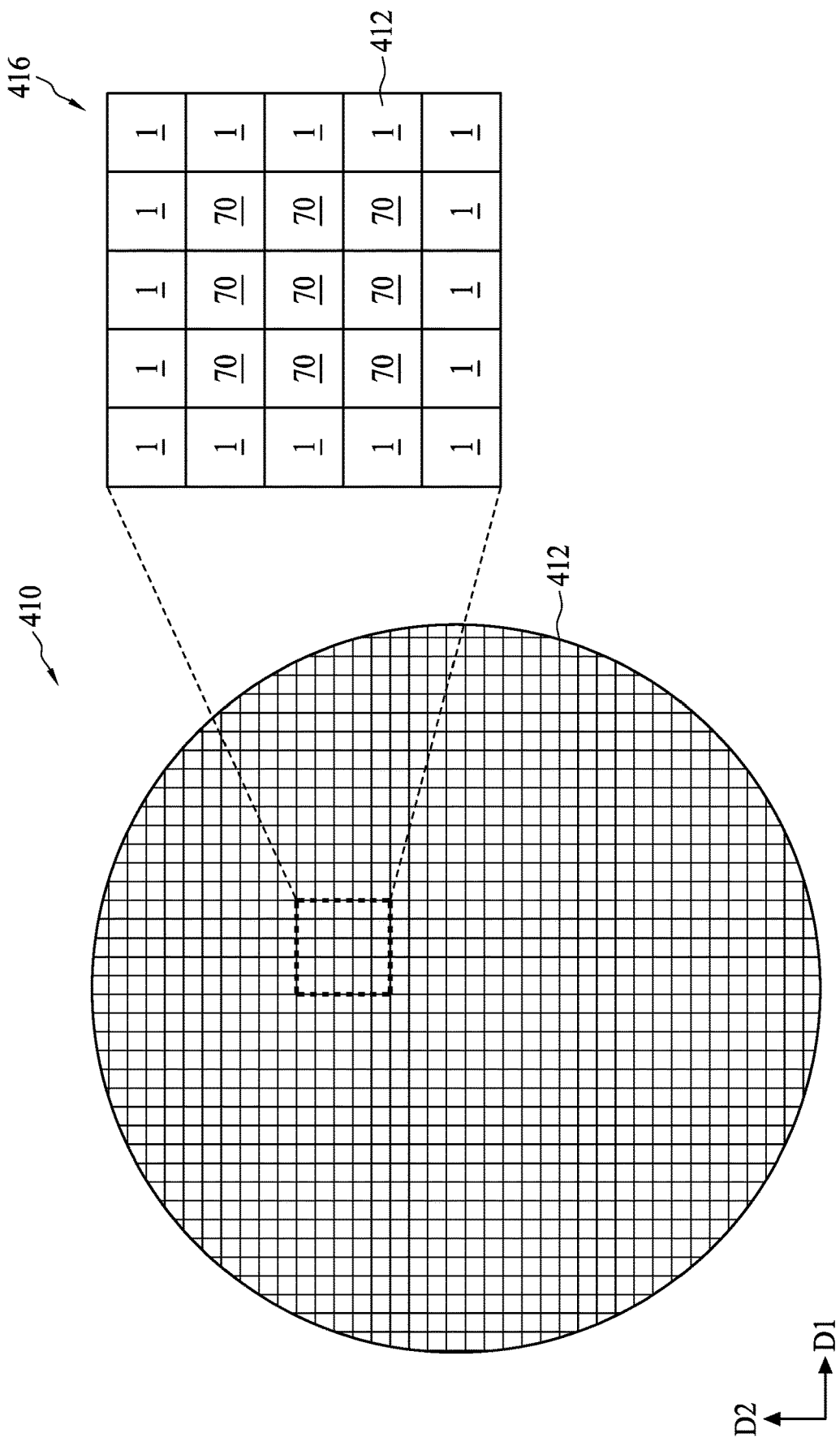

As shown in FIG. 19, the potential defect region 414 is enlarged. In some embodiments, the regions 412 are arranged along columns and rows as mentioned above, and the potential defect region 414 may include regions 412 having differences greater than the value, wherein such regions are also arranged to form columns and rows. In such embodiments, the potential defect region 414 is enlarged to include at least one column at its right side and one column at its left side. Similarly, the potential defect region 414 is enlarged to include at least one row at its upper side and one row at its lower side. Consequently, the defect region 416 is made larger than the potential defect region 414. Further, the defect region 416 has a width along the first direction D1 and a length along the second direction D2. In some embodiments, the width and the length are substantially equal. In some embodiments, an area of the defect region 416 is enlarged to between approximately $2\times2$ $\mu m^2$ and $0.1\times0.1$ $\mu m^2$. It should be noted that if the defect region 416 is smaller than $2\times2$ $\mu m^2$ or larger than $10\times10$ $\mu m^2$, it may impact the defect inspection, which is described in the following description.

At operation 305, a first group, a second group and an $N^{th}$ group are defined, wherein each of the first group, the second group and the $N^{th}$ group has at least a first region or at least a second region, the regions in the same group have the differences in a same range, and regions in different groups have the differences in different ranges.

Figure 20:
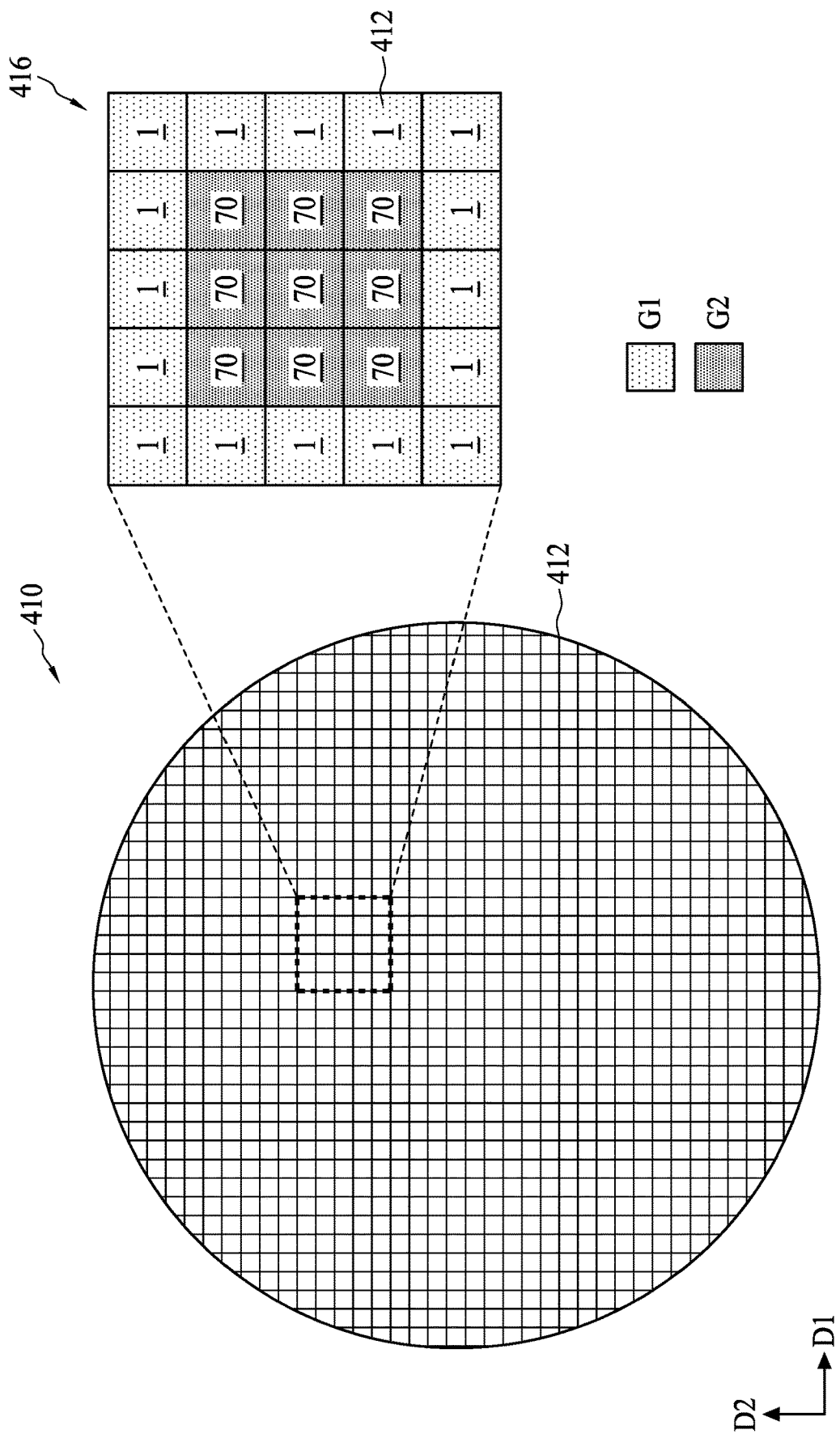

As shown in FIG. 20, in some embodiments, the regions 412 are grouped into the first group G1 and the second group G2 according to the differences. In some embodiments, the grouping of the regions 412 according to the difference can be performed according to the aforementioned Table 1.

According to Table 1, ranges are provided, and regions 412 having differences in the same range are grouped into a same group. In some embodiments, each of the first group G1 and the second group G2 has at least a region 412. Further, the regions 412 in the same group have the differences in a same range, and regions 412 in different groups have the differences in different ranges. For example, the region 414 in the first group G1 has a first difference between its gray scale value and the gray scale reference, and the region 412 in the second group G2 has a second difference between its gray scale value and the gray scale reference, as shown in FIG. 20. In some embodiments, an absolute value of the first difference is less than an absolute value of the second difference, and an absolute value of the $(N-1)^{th}$ difference is less than an absolute value of the $N^{th}$ difference, as shown in Table 1.

At operation 306, a first calculation is performed to obtain a score. In some embodiments, the first calculation is performed according to an equation (2):

$$W_s = \frac{\Sigma|(G \times e_1)_{G1}| + \Sigma|(G \times e_2)_{G2}| + \Sigma|(G \times e_3)_{G3}| + \ldots}{\Sigma|G|_{G1,G2,G3\ldots}} \quad (2)$$

Wherein Ws is the score, G is the individual gray value in the first region G1, the second region G2, the third region G3 and the $N^{th}$ region $G_N$, $e_1$ is a first weighting factor, $e_2$ is a second weighting factor, and $e_n$ is an $N^{th}$ weighting factor. In some embodiments, the first weighting factor $e_1$ is less than the second weighting factor $e_2$, and the $(N-1)^{th}$ weighting factor $e_{(n-1)}$ is less than the $N^{th}$ weighting factor $e_n$, as shown in Table 1.

For example, in some embodiments, the differences as shown in FIG. 20 can be used in the calculation:

$$Ws = \frac{(1 \times 16) \times 0.9 + (70 \times 9) \times 0.95}{1 \times 16 + 70 \times 9} = 0.949$$

According to the equation (2), the score Ws is obtained as mentioned above.

At operation 307a, when the score Ws is greater than a value, the substrate is determined to have a complicated defect. At operation 307b, when the score is less than the value, the substrate is determined to be free of the complicated defect.

In some embodiments, the value can be 0.92. Therefore, when the score Ws is 0.949, which is greater than 0.92, the complicated defect is determined to exist. It should be noted that the difference between the gray scale values of the region 412 of the image 410 and the gray scale values of the gray scale reference may show a variation between a surface condition of the patterns on the photomask PM2 after the manufacturing operations and a desired surface condition of the desired photomask d-PM. A greater difference may indicate that the surface condition of the photomask PM2 being inspected is more different from that found in a similar comparison showing a lesser difference. Further, the greater difference may be amplified by multiplying the gray scale value by the weighting factor. Consequently, the complicated defect can be easily determined to exist.

In some embodiments, an aerial image measurement system (AIMS) is used when the substrate is determined to have the ESD defect. The AIMS is a measurement methodology which can provide a capability to simulate the exposure result on a substrate, i.e. a photomask substrate, by, including but not limited to, optical proximity correction (OPC), mask error enhancement factor (MEEF), and mask 3D effects information. In some embodiments, the AIMS can be used to double check the complicated defect.

In some embodiments, the method for defect inspection 300 can include further operations (308, 309a and 309b). These operations will be further described according to one or more embodiments. It should be noted that the operations of the method for defect inspection 300 may be rearranged or otherwise modified within the scope of the various aspects. It should further be noted that additional processes may be provided before, during, and after the method 300, and that some other processes may only be briefly described herein. Thus, other implementations are possible within the scope of the various aspects described herein.

At operation 308, a second calculation is performed to obtain a graphical diagram.

Figure 21A:
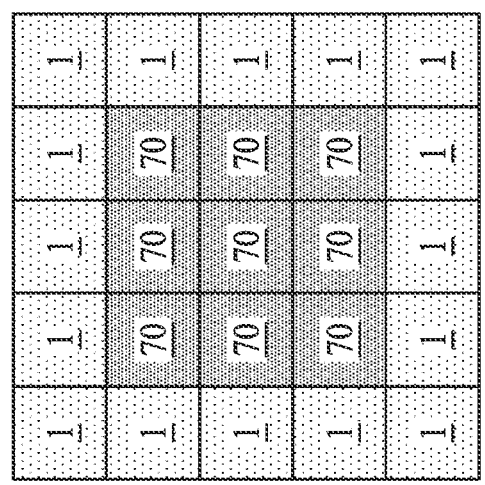
FIG. 21A is a portion of a gray scale image of the photomask.
Figure 21B:
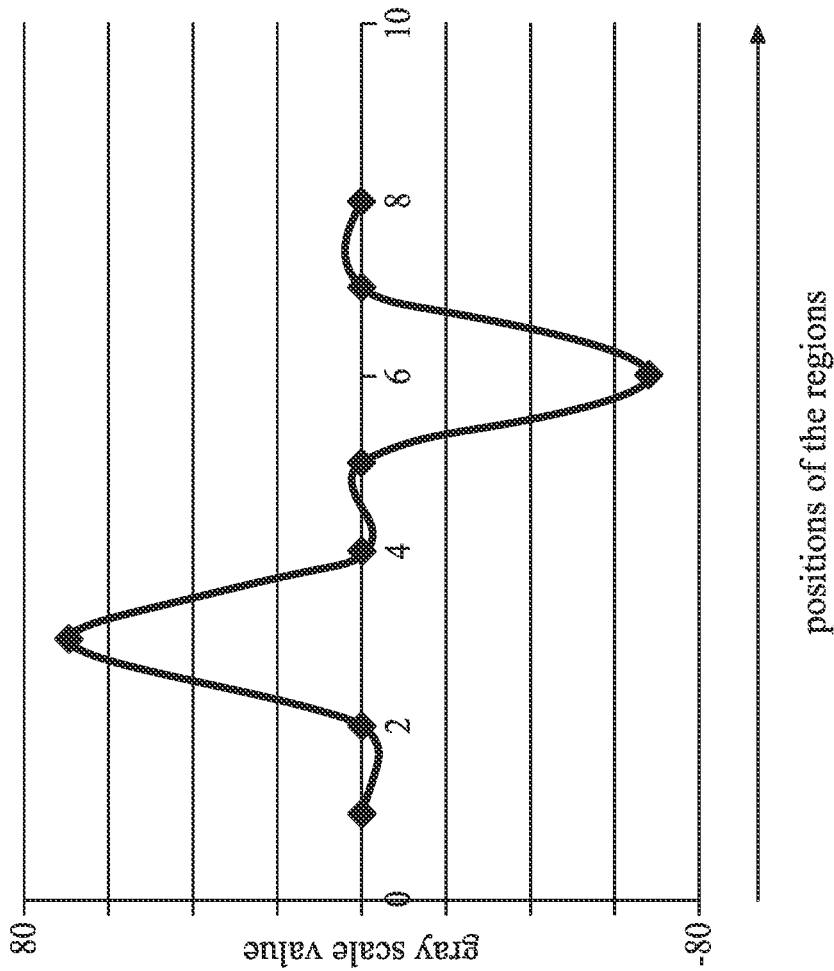
FIG. 21B is graphical diagram representing a calculation result according to aspects of the present disclosure in one or more embodiments.

In some embodiments, the second calculation is a first order derivative of the equation (2). In some embodiments, a graphical diagram representing the result of the second calculation can be obtained, as shown in FIG. 21B. In FIG. 21B, the abscissa indicates positions of the regions 412 used in the first and second calculations, and the ordinate indicates the gray scale values.

At operation 309a, when two peaks are shown in the graphical diagram, the substrate is determined to have a shielding layer extension defect. At operation 309b, when more than two peaks are shown in the graphical diagram, the substrate is determined to have a hard mask/shielding layer extension defect.

As shown in FIG. 21B, because there are two peaks shown in the graphical diagram, the photomask PM2 is determined to have a shielding layer extension defect. Accordingly, not only can the complicated defect be determined to exist but the type of complicated defect (i.e., the shielding layer extension defect) can also be identified.

As mentioned above, after the shielding layer extension defect is identified, an AIMS can be used to double check the shielding layer extension defect. In some embodiments, further operations can be performed to remove the unnecessary shielding layer. For example, a removal operation can be performed. In some embodiments, the etching gases including $Cl_2$, $SnCl_4$, NOCl, $NO_2Cl$, $CCl_4$, or other suitable gases can be used in the removal operations.

Figure 22:
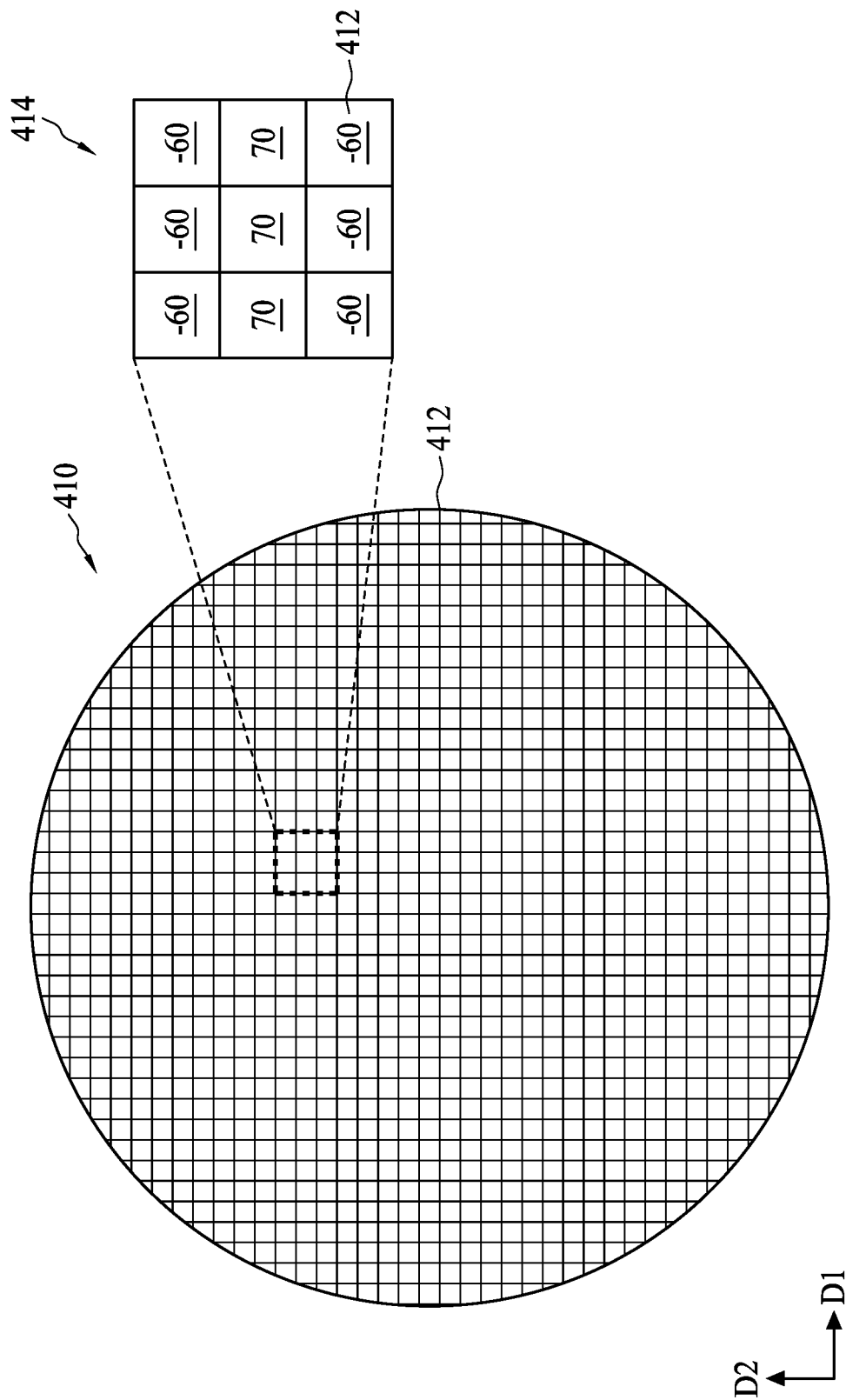
FIGS. 22 to 24 are schematic drawings of the photomask at various stages according to aspects of the present disclosure in one or more embodiments.

Further, the method for defect inspection 300 can used to identify the hard mask/shieling layer extension defect. For example, operations 301 to 303 can be performed to identify a potential defect region in other embodiments, as shown in FIG. 22.

Figure 23:
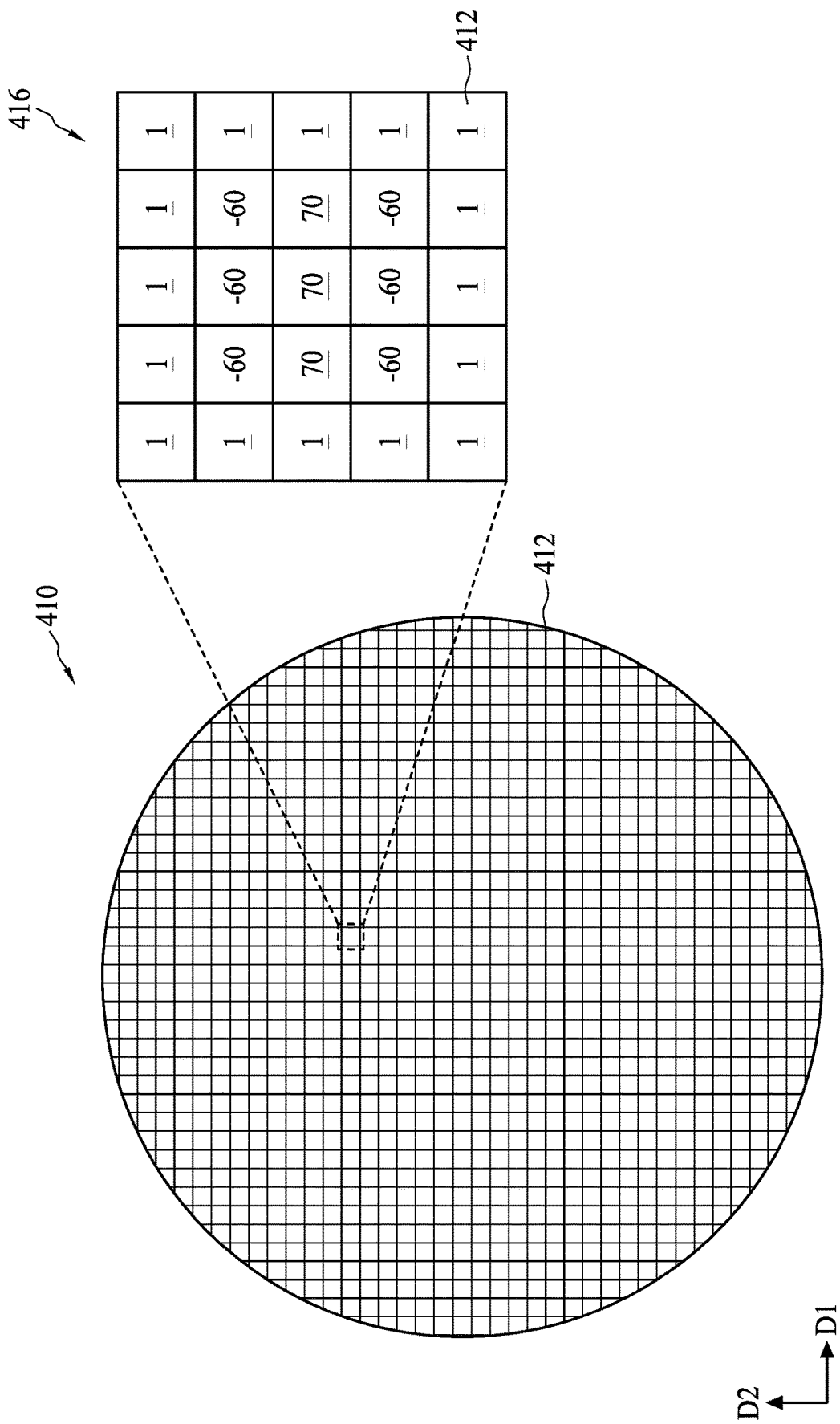

As shown in FIG. 23, the potential defect region 414 is enlarged at operation 304. In some embodiments, the regions 412 are arranged along columns and rows as mentioned above, and the potential defect region 414 may include regions 412 having differences greater than the value, wherein such regions 412 are also arranged to form columns and rows. In such embodiments, the potential defect region 414 is enlarged to include at least one column at its right side and one column at its left side. Similarly, the potential defect region 414 is enlarged to include at least one row at its upper side and one row at its lower side. Consequently, the defect region 416 is larger than the potential defect region 414. Further, the defect region 416 has a width along the first direction D1 and a length along the second direction D2. In some embodiments, the width and the length are substantially equal to each other. In some embodiments, an area of the defect region 416 is enlarged to between approximately $2 \times 2$ $\mu m^2$ and $0.1 \times 0.1$ $\mu m^2$. It should be noted that if the defect region 416 is smaller than $2 \times 2$ $\mu m^2$ or larger than $10 \times 10$ $\mu m^2$, the defect inspection may be impacted, as described in the following description.

At operation 305, a first group, a second group and an $N^{th}$ group are defined, wherein each of the first group, the second group and the $N^{th}$ group has at least a first region or at least a second region, the regions in the same group have the differences in a same range, and regions in different groups have the differences in different ranges.

Figure 24:
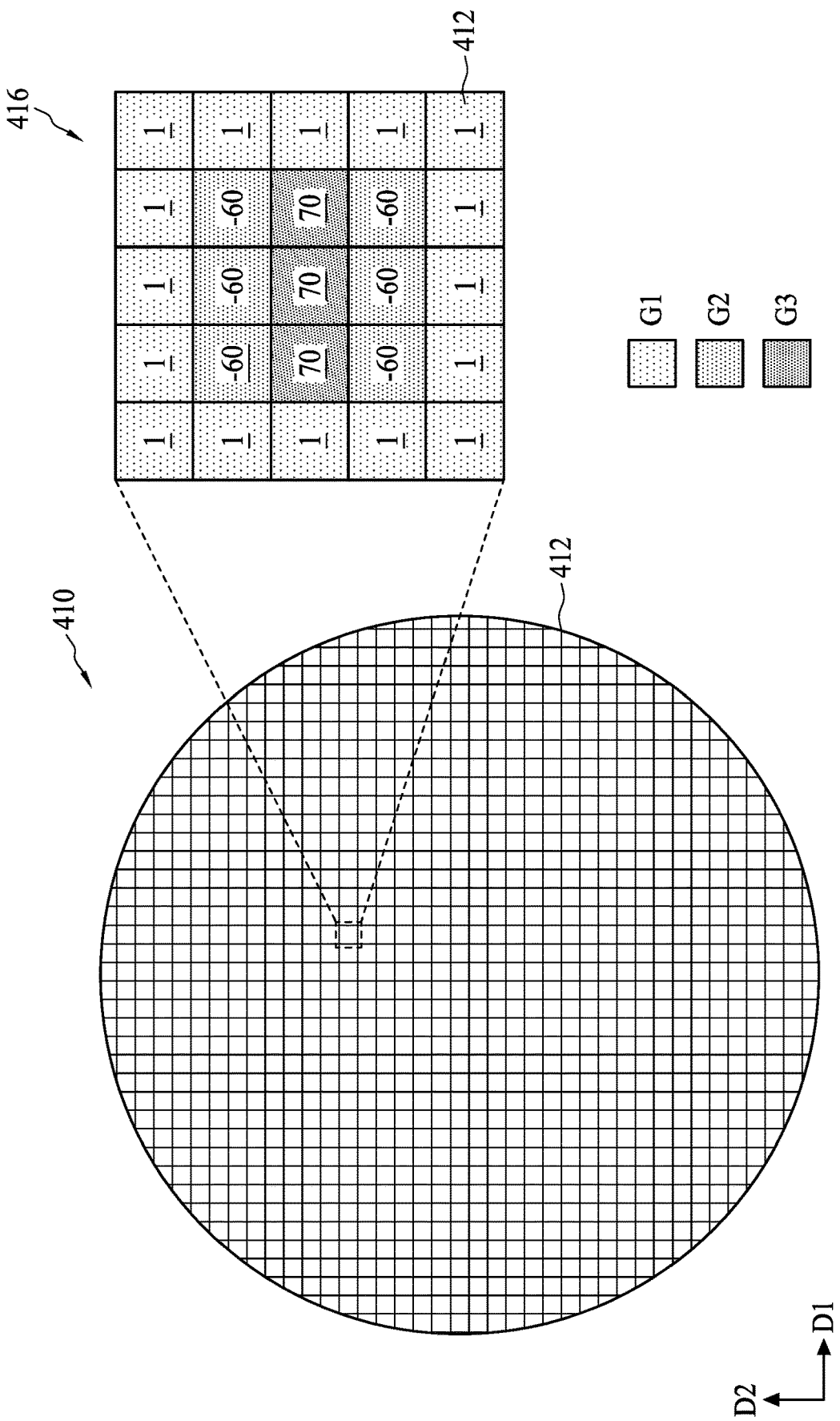

As shown in FIG. 24, in some embodiments, the regions 412 are grouped into the first group G1, the second group G2 and a third group G3 according to the differences. In some embodiments, the grouping of the regions 412 according to the differences can be performed according to the aforementioned Table 1.

According to Table 1, ranges are provided, and regions 412 having differences in the same range are grouped into a same group. In some embodiments, each of the first group G1, the second group G2 and the $N^{th}$ group Gn has at least a region 412. Further, the regions 412 in the same group have the differences in a same range, and regions 412 in different groups have the differences in different ranges. For example, the region 414 in the first group G1 has a first difference between its gray scale value and the gray scale reference, the region 412 in the second group G2 has a second difference between its gray scale value and the gray scale reference, and the region 414 in the third group G3 has a third difference between its gray scale value and the gray scale reference, as shown in FIG. 24. In some embodiments, an absolute value of the first difference is less than an absolute value of the second difference, and an absolute value of the (N−1)$^{th}$ difference is less than an absolute value of the N$^{th}$ difference, as shown in Table 1.

At operation 306, a first calculation is performed to obtain a score. In some embodiments, the first calculation is performed according to the equation (2).

For example, in some embodiments, the differences as shown in FIG. 24 can be used in the first calculation:

$$W_S = \frac{|(1 \times 16) \times 0.9| + |(-60 \times 6) \times 0.925| + |(70 \times 3) \times 0.95|}{|1 \times 16| + |-60 \times 6| + |70 \times 3|} = 0.93$$

According to the equation (2), the score Ws is obtained as described above.

At operation 307a, when the score Ws is greater than a value, the substrate is determined to have a complicated defect. At operation 307b, when the score is less than the value, the substrate is determined to be free of the complicated defect.

In some embodiments, the value can be 0.92. Therefore, when the score Ws is 0.93, which is greater than 0.92, the substrate is determined to have the complicated defect. It should be noted that the difference between the gray scale values of the regions 412 of the image 410 and the gray scale values of the gray scale reference may show a variation between a surface condition of the patterns on the photomask PM2 after the manufacturing operations and a desired surface condition of the desired photomask d-PM. A greater difference may indicate that the surface condition of the photomask PM2 being inspected is more different from the desired surface condition of the desired photomask d-PM than that found in a similar comparison showing a lesser difference. Further, the greater difference may be amplified by multiplying the gray scale value by the weighting factor. Consequently, the complicated defect can be easily identified.

In some embodiments, an AIMS is used when the substrate is determined to have the complicated defect. The AIMS is a measurement methodology which has a capability to simulate the exposure result on a substrate, i.e., a photomask substrate, by, including but not limited to, OPC, MEEF and mask 3D effects information. In some embodiments, the AIMS can be used to double check the complicated defect.

In some embodiments, operation 308 is performed, in which a second calculation is performed to obtain a graphical diagram.

Figures 25A, 25B:
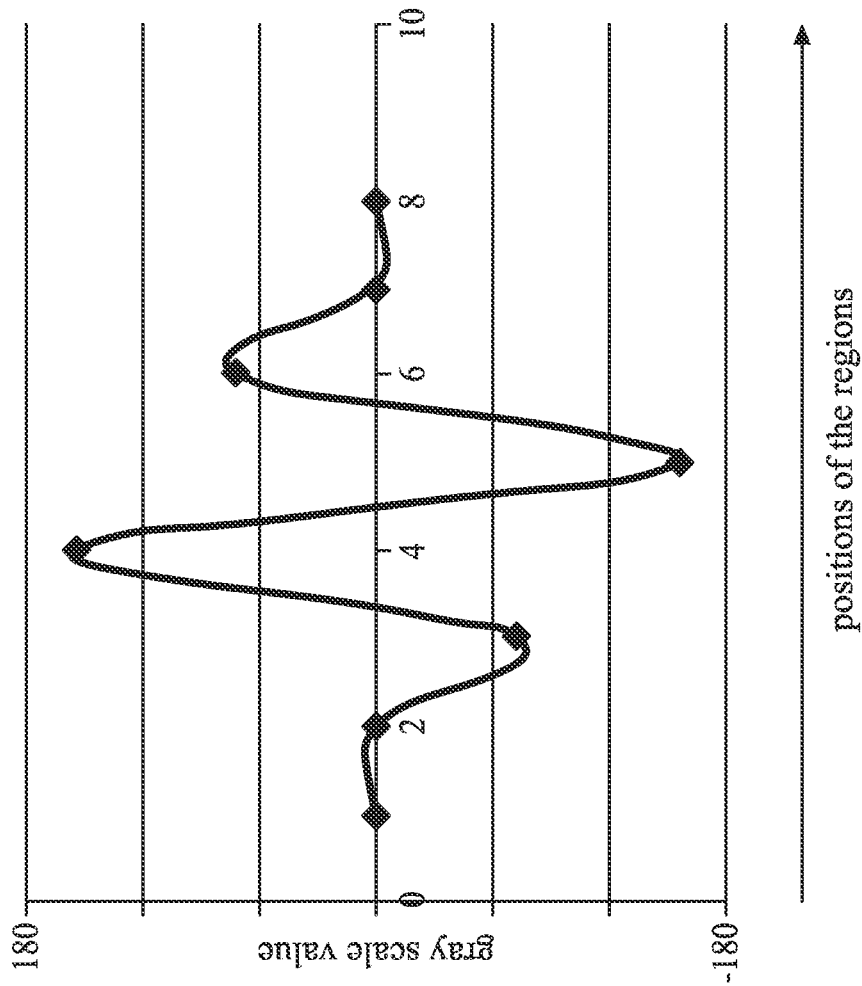
FIG. 25A is a portion of a gray scale image of the photomask.
FIG. 25B is graphical diagram representing a calculation result according to aspects of the present disclosure in one or more embodiments.

In some embodiments, the second calculation is a first order derivative of equation (2). In some embodiments, a graphical diagram showing the result of the second calculation can be obtained, as shown in FIG. 25B. In FIG. 25B, the abscissa indicates positions of the regions 412 used in the first and second calculations, and the ordinate indicates the gray scale values.

At operation 309a, when two peaks are shown in the graphical diagram, the substrate is determined to have a shielding layer extension defect. At operation 309b, when more than two peaks are shown in the graphical diagram, the substrate is determined to have a hard mask/shielding layer extension defect.

As shown in FIG. 25B, because there are more than two peaks (i.e., four peaks) shown in the graphical diagram, the photomask PM2 is determined to have a hard mask/shielding layer extension defect.

As mentioned above, after the hard mask/shielding layer extension defect is determined to exist, an AIMS can be used to double check the hard mask/shielding layer extension defect. In some embodiments, further operations can be performed to remove the unnecessary hard mask layer and shielding layer. For example, a first removal operation can be performed to remove the unnecessary hard mask layer. In some embodiments, etching gases including $F_2$, $CF_4$, $SF_6$, $SnF_4$, $XeF_2$, $I_2$, or other suitable gases can be used in the removal operations. Further, a second removal operation can be performed to remove the unnecessary shielding layer. The etching gases used in the second removal operation can be similar to those described above, and therefore repeated descriptions are omitted in the interest of brevity.

Additionally, the determination of the photomask PM2 as being free of the complicated defect should mean that a thin film 408a and/or 408b has not formed over the pattern (i.e., the phase-shifting layer 402); however, such thin film 408a and/or 408b may actually have formed over the pattern but is not thick enough to alter the reflection and therefore may not be detected. Consequently, the photomask PM2 might be used in a subsequent exposure operation. In some embodiments, the determination of the photomask PM2 as having the complicated defect may mean that a thin film 408a and/or 408b has formed over the pattern (i.e., the phase-shifting layer 402) and is thick enough to alter the reflection, thus deteriorating the exposure result. In some embodiments, subsequent operations 308, 309a and 309b are performed to determine the type of complicated defect that exists. Consequently, a suitable removal operation can be performed.

As mentioned above, the complicated defect occurs when a thin film is formed over the pattern surface of the photomask PM2. The complicated defect may not be distinguishable but may cause serious problems in the exposure operation. By grouping the regions 412 into the first group G1, the second group G2 and the N$^{th}$ group Gn, and by providing different weight factors for different groups, the groups that may include the complicated defect can be amplified. Further, by performing the first calculation with the equation, the score Ws, which may represent the condition of the entire surface, can be easily obtained. In addition, the complicated defect can be determined to exist when the score Ws is greater than the value. In some embodiments, the value is adjustable.

The method for defect inspection 300 can be performed to detect the ESD defect. In some embodiments, the method for defect inspection provides a weighting model. The weighting model helps to amplify the ESD defect and thus the ESD defect can be detected. In some embodiments, the method for defect inspection 300 provides the second calculation, which helps to distinguish the shielding layer extension defect from the hard mask/shielding layer extension defect. Thus, the suitable removal operations can be performed.

The present disclosure provides a method for defect inspection. In some embodiments, the method for defect inspection is performed to detect the ESD defect. In some embodiments, the method for defect inspection provides a first calculation. The first calculation helps to amplify the ESD defect and thus the ESD defect can be determined. In some embodiments, the method for defect inspection is performed to detect the complicated defects. In some embodiments, the method for defect inspection provides two calculations. The first calculation is performed to determine that the complicated defect exists, and the second calculation is performed to distinguish whether the complicated defect is the shielding layer extension defect or the hard mask/shielding layer extension defect. Thus, the suitable removal operations can be performed. The provided method for defect inspection is able to precisely detect and identify the defects using the current inspection tool. Accordingly, inspection reliability can be improved, and inspection cycle time can be reduced. Further, extra cost for tool modification can be saved.

According to one embodiment of the present disclosure, a method for defect inspection is provided. The method includes receiving a substrate having a surface and a plurality of patterns disposed on the surface; obtaining a gray scale image of the substrate, wherein the gray scale image includes a plurality of regions, and each of the regions has a gray scale value; comparing the gray scale value of each region to a gray scale reference to define a first group, a second group and an $N^{th}$ group, wherein each of the first group, the second group and the $N^{th}$ group has at least a region, and the region in the first group has a first difference between its gray scale value and the gray scale reference, the region in the second group has a second difference between its gray scale value and the gray scale reference, and the region in the $N^{th}$ group has an $N^{th}$ difference between its gray scale value and the gray scale reference; performing a calculation according to the first difference, the second difference and the $N^{th}$ difference to obtain a score; and when the score is greater than a value, determining the substrate to have an electrostatic discharge (ESD) defect, and when the score is less than the value, determining the substrate to be free of the ESD defect.

According to one embodiment of the present disclosure, another method for defect inspection is provided. The method includes receiving a substrate having a surface and a plurality of patterns disposed on the surface; obtaining a gray scale image of the substrate; defining a defect region in the gray scale image, wherein the defect region has a plurality of first regions, each of the first regions has a gray scale value and a difference between its gray scale value and a gray scale reference; performing a calculation to obtain a score; and when the score is greater than a value, determining the substrate to have a complicated defect, and when the score is less than the value, determining the substrate to be free of the complicated defect.

According to one embodiment of the present disclosure, another method for defect inspection is provided. The method includes receiving a substrate having a surface and a plurality of patterns disposed on the surface; obtaining a gray scale image of the substrate; defining a defect region in the gray scale image, wherein the defect region has at least a first region and a plurality of second regions, each of the first and second regions has a gray scale value and a difference between its gray scale value and a gray scale reference; performing a first calculation according to the differences between the gray scale reference and the gray scale value of each of the regions in the defect region to obtain a score; performing a second calculation to obtain a graphical diagram when the score is greater than a value; and, when two peaks are shown in the graphical diagram, determining the substrate to have a shielding layer extension defect, and when more than two peaks are shown in the graphical diagram, determining the substrate to have a hard mask/shielding layer extension defect.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for defect inspection, comprising:
receiving photomask having a surface and a plurality of patterns disposed on the surface;
obtaining a gray scale image of the photomask, using a scanner of a lithography system, wherein the gray scale image comprises a plurality of regions, and each of the regions has a gray scale value;
comparing the gray scale value of each region to a gray scale reference, using a computing system of the lithography system, to define a first group, a second group and an $N^{th}$ group, wherein each of the first group, the second group and the $N^{th}$ group has at least a region, and the region in the first group has a first difference between its gray scale value and the gray scale reference, the region in the second group has a second difference between its gray scale value and the gray scale reference, and the region in the Nth group has an $N^{th}$ difference between its gray scale value and the gray scale reference;
performing a calculation according to the first difference, the second difference and the $N^{th}$ difference to obtain a score in order to improve an inspection for an electrostatic discharge (ESD) defect by the computing system of the lithography system;
determining the photomask to have the ESD defect or to be free of the ESD defect according to the score obtained from the calculation, wherein the calculation is performed according to an equation (1):

$$Ws = \frac{\sum e_1(G)_{G1} + \sum e_2(G)_{G2} + \sum e_3(G)_{G3} + ... \sum e_n(G)_{Gn}}{\sum (G)_{G1,G2,G3,...Gn}} \quad (1)$$

wherein Ws is the score, G is an individual difference of a region in a first group $G_1$, a second group $G_2$, a third group $G_3$ and a $N^{th}$ group $G_N$, and $e_1$ is a first weighting factor, $e_2$ is a second weighting factor, and $e_n$ is an $N^{th}$ weighting factor; and
performing an exposure operation using the photomask when the photomask is determined to be free of the ESD defect, or removing the photomask from the exposure operation when the photomask is determined to have the ESD defect.

2. The method of claim 1, wherein the obtaining of the gray scale image of the photomask further comprises:
scanning the surface of the photomask with an optical inspection tool to generate light reflected from the surface of the photomask; and
obtaining the gray scale image of the photomask according to the reflected lights.

3. The method of claim 1, wherein the first difference is less than the second difference, and the $(N-1)^{th}$ difference is less than the $N^{th}$ difference.

4. The method of claim 1, wherein the first weighting factor is less than the second weighting factor, and the $(N-1)^{th}$ weighting factor is less than the $N^{th}$ weighting factor.

5. The method of claim 1, wherein the substrate photomask further comprises a pellicle covering the surface and the plurality of patterns.

6. The method of claim 1, wherein the plurality of patterns comprise a phase shifting layer and a shielding layer.

7. The method of claim 1, further comprising performing an exposure operation prior to the obtaining the gray scale image of the substrate photomask.

8. A method for defect inspection, comprising:
receiving a photomask having a surface and a plurality of patterns disposed on the surface;
obtaining a gray scale image of the photomask using a scanner of a lithography system;
defining a defect region in the gray scale image, using a computing system of the lithography system, wherein the defect region has a plurality of first regions, and each of the first regions has a gray scale value and a difference between the gray scale value and a gray scale reference;
performing a calculation to obtain a score in order to improve an inspection for a complicated defect by the computing system of the lithography system; and
determining the photomask to have the complicated defect or to be free of the complicated defect according to the score obtained from the calculation, wherein the calculation is performed according to an equation (2):

$$W_s = \frac{\Sigma |(G \times e_1)_{G1}| + \Sigma |(G \times e_2)_{G2}| + \Sigma |(G \times e_3)_{G3}| + \ldots}{\Sigma |G|_{G1,G2,G3\ldots}} \quad (2)$$

wherein Ws is the score, G is an individual difference of a region in a first group G1, a second group G2, a third group G3 and an $N^{th}$ group GN, $e_1$ is a first weighting factor, $e_2$ is a second weighting factor, and $e_n$ is an $N^{th}$ weighting factor; and
performing an exposure operation using the photomask when the photomask is determined to be free of the complicated defect, or removing the photomask from the exposure operation when the photomask is determined to have the complicated defect.

9. The method of claim 8, wherein the defining of the defect region in the gray scale image further comprises:
comparing the gray scale image to the gray scale reference to identify the plurality of first regions; and
identifying a plurality of second regions surrounding the first regions.

10. The method of claim 9, wherein the defining of the defect region in the gray scale image further comprises defining a first group, a second group and an $N^{th}$ group, wherein each of the first group, the second group and the $N^{th}$ group has at least a first region or at least a second region, the first regions or the second regions in the same group have the differences in a same range, and the first regions and the second regions in different groups have the differences in different ranges.

11. The method of claim 8, wherein the defect region has a width along a first direction and a length along a second direction, and the width and the length are substantially equal to each other.

12. The method of claim 8, wherein the first weighting factor is less than the second weighting factor, and $(N-1)^{th}$ weighting factor is less than the $N^{th}$ weighting factor.

13. The method of claim 8, further comprising:
obtaining a first order derivative of the equation (2); and
drawing a graphical diagram of the first order derivative.

14. The method of claim 13, wherein when two peaks are shown in the graphical diagram, the photomask is determined to have a shielding layer extension defect, and when more than two peaks are shown in the graphical diagram, the photomask is determined to have a hard mask/shielding layer extension defect.

15. The method of claim 8, further comprising performing photomask manufacturing operations, phase-shift photomask manufacturing operations, or hard mask attenuated phase shift mask operations to form the plurality of patterns.

16. A method for defect inspection, comprising:
receiving a photomask having a surface and a plurality of patterns disposed on the surface;
obtaining a gray scale image of the photomask using a scanner of a lithography system;
defining a defect region in the gray scale image, using a computing system of the lithography system, wherein the defect region has at least a first region and a plurality of second regions, the first region has a gray scale value and a difference between the gray scale value of the first region and a gray scale reference, and each second region has a gray scale value and a difference between the gray scale value of the second region and the gray scale reference;
performing a first calculation, using the computing system of the lithography system, according to the difference between the gray scale reference and the gray scale values of the first region and the second regions in the defect region to obtain a score;
performing a second calculation, using the computing system of the lithography system, to obtain a graphical diagram,
wherein the first calculation and the second calculating are performed to improve an inspection to a hard mask/shielding layer extension defect, when two peaks are shown in the graphical diagram, determining the photomask to have a shielding layer extension defect, and when more than two peaks are shown in the graphical diagram, determining the photomask to have the hard mask/shielding layer extension defect; and
performing a first removal operation and a second removal operation when the photomask is determined to have the hard mask/shielding layer extension defect, and performing the second removal operation when the photomask is determined to have the shielding layer extension defect.

17. The method of claim 16, wherein the defining of the defect region in the gray scale image further comprises:
comparing the gray scale image to the gray scale reference to identify a potential defect region including at least the first region; and
enlarging the potential defect region to include the second regions to define the defect region.

18. The method of claim 16, further comprising comparing the gray scale value of each first region to the gray scale reference and comparing the gray scale value of each second region to the gray scale reference to define a first group, a second group and an $N^{th}$ group, wherein each of the first group, the second group and the $N^{th}$ group has at least the first region or the second regions, each of first region or the second regions in the first group has a first difference between its gray scale value and the gray scale reference, each of the first region the second regions in the second group has a second difference between its gray scale value and the gray scale reference, each of the first region and the second regions in the $N^{th}$ group has an $N^{th}$ difference between its gray scale value and the gray scale reference.

19. The method of claim 18, wherein the first calculation comprises an equation (3):

$$W_s = \frac{\Sigma|(G \times e_1)_{G1}| + \Sigma|(G \times e_2)_{G2}| + \Sigma|(G \times e_3)_{G3}| + \ldots}{\Sigma|G|_{G1,G2,G3\ldots}} \quad (3)$$

wherein $W_s$ is the score, G is an individual difference of a region in the first region G1, the second region G2, the third region G3 and the $N^{th}$ region $G_N$, and $e_1$ is a first weighting factor, $e_2$ is a second weighting factor, and $e_n$ is an $N^{th}$ weighting factor.

20. The method of claim 19, wherein the second calculation is
a first order derivative of the equation (3).

* * * * *